United States Patent
Wondraczek

(10) Patent No.: US 10,276,841 B2
(45) Date of Patent: Apr. 30, 2019

(54) MODULE CARRIER FOR BATTERY CELLS AND METHOD FOR PRODUCING THE MODULE CARRIER, AND BATTERY MODULE, BATTERY PACK, BATTERY AND BATTERY SYSTEM

(71) Applicant: Robert Bosch GmbH, Stuttgart (DE)

(72) Inventor: Lutz Wondraczek, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 572 days.

(21) Appl. No.: 14/600,244

(22) Filed: Jan. 20, 2015

(65) Prior Publication Data
US 2015/0207115 A1    Jul. 23, 2015

(30) Foreign Application Priority Data
Jan. 20, 2014    (DE) ........................ 10 2014 200 877

(51) Int. Cl.
*H01M 2/00* (2006.01)
*H01M 2/10* (2006.01)
(Continued)

(52) U.S. Cl.
CPC ....... *H01M 2/1005* (2013.01); *H01M 2/1077* (2013.01); *H01M 2/1094* (2013.01);
(Continued)

(58) Field of Classification Search
CPC ........... H01M 2/1005; H01M 10/6556; H01M 2/1077; H01M 10/6567; H01M 2/1094;
(Continued)

(56) References Cited

U.S. PATENT DOCUMENTS

| | | | | |
|---|---|---|---|---|
| 2011/0117421 A1* | 5/2011 | Kim | ................... | H01M 2/0207 429/163 |
| 2011/0206948 A1* | 8/2011 | Asai | ................... | H01M 2/0473 429/7 |
| 2012/0148889 A1* | 6/2012 | Fuhr | ................... | H01M 2/1077 429/87 |
| 2012/0188714 A1* | 7/2012 | Von Borck | ......... | H01M 2/1061 361/688 |

(Continued)

FOREIGN PATENT DOCUMENTS

| | | |
|---|---|---|
| DE | 102010046529 | 3/2012 |
| DE | 102010041701 | 4/2012 |

(Continued)

OTHER PUBLICATIONS

English Translation of JP2009-009889.*

*Primary Examiner* — Nicholas P D'Aniello
(74) *Attorney, Agent, or Firm* — Michael Best & Friedrich LLP

(57) ABSTRACT

A module carrier ($20$; $20'$; $30$; $40$; $50$; $60$; $70$; $80$; $90$; $92$; $94$) for battery cells ($100_1$, $100_2$, $100_3$), characterized by: a first carrier device ($200_1$) and a second carrier device ($200_2$), which is arranged opposite the first carrier device ($200_1$), for carrying the battery cells ($100_1$, $100_2$, $100_3$), and a first connecting device ($300_1$) and a second connecting device ($300_2$), which is arranged opposite the first connecting device ($300_1$), in each case for connecting the first carrier device ($200_1$) and the second carrier device ($200_2$).

19 Claims, 12 Drawing Sheets

(51) Int. Cl.
   *H01M 10/613*  (2014.01)
   *H01M 10/625*  (2014.01)
   *H01M 10/6567* (2014.01)
   *H01M 10/6556* (2014.01)
   *H01M 10/617*  (2014.01)

(52) U.S. Cl.
   CPC ....... *H01M 10/613* (2015.04); *H01M 10/625* (2015.04); *H01M 10/6556* (2015.04); *H01M 10/6567* (2015.04); *H01M 10/617* (2015.04); *H01M 2220/20* (2013.01)

(58) Field of Classification Search
   CPC ............. H01M 10/613; H01M 10/625; H01M 10/617; H01M 2220/20
   See application file for complete search history.

(56) References Cited

U.S. PATENT DOCUMENTS

2013/0022855 A1   1/2013  Hsiao et al.
2013/0189559 A1*  7/2013  Giere ................ H01M 10/655
                                            429/120

FOREIGN PATENT DOCUMENTS

| DE | 102011084536 |   | 4/2013  |              |
|----|--------------|---|---------|--------------|
| EP | 2362463      |   | 8/2011  |              |
| EP | 2611637      |   | 12/2014 |              |
| JP | 2009-009889  | * | 1/2009  | ........... H01M 10/50 |
| JP | 2009009889   |   | 1/2009  |              |
| WO | 2012028927   |   | 3/2012  |              |
| WO | WO2012038008 | * | 3/2012  | .............. H01M 2/10 |

* cited by examiner

MODULE CARRIER FOR BATTERY CELLS AND METHOD FOR PRODUCING THE MODULE CARRIER, AND BATTERY MODULE, BATTERY PACK, BATTERY AND BATTERY SYSTEM

BACKGROUND OF THE INVENTION

The invention relates to a module carrier for battery cells, and to a method for producing the module carrier, and to a battery module, a battery pack, a battery and a battery system. The invention furthermore relates to a vehicle, in particular a motor vehicle, such as an electric motor vehicle or hybrid vehicle, with the module carrier, the battery module, the battery or the battery system.

It is foreseeable that both in the case of stationary applications, for example in wind power installations, and in the case of mobile applications, for example in the case of electric motor vehicles (electric vehicles, EV) or hybrid vehicles (hybrid electric vehicles, HEV), use will increasingly be made of novel battery systems, for example with lithium-ion storage batteries or nickel-metal hybrid storage batteries, as rechargeable energy accumulators.

The battery systems have to meet very stringent requirements with regard to the useable energy content, the charging/discharging efficiency, the reliability, the service life and the undesirable loss in capacity due to frequent partial discharging.

A battery system comprises a multiplicity of battery cells. The battery cells heat up during the charging and discharging because of the internal resistance of their cells and the electrochemical processes taking place. The battery cells can be connected in series, in order to increase the electric voltage, and/or can be connected in parallel, in order to increase the maximum electric current. The battery cells can be combined here to form battery units or battery modules. For example, three to twelve battery cells can be combined in a battery module. The battery module holds the battery cells and absorbs mechanical stresses, and therefore the battery module protects the battery cells against damage. Furthermore, the battery module realizes a mechanical bracing of the battery cells and provides electric insulation. In addition, the battery module can serve for controlling the temperature of the battery cells. The battery modules can be combined to form a battery pack. In the event of use for driving vehicles, it is possible for, for example, approximately 100 battery cells to be connected in series or in parallel (as a traction battery). In the case of a high voltage battery system, the total voltage can therefore be, for example, 450 V or even 600 V.

The reliable temperature range for operating the battery cells is typically between −30° C. and +70° C., preferably between +5° C. and +35° C. The performance of the battery cells can decrease significantly in the lower range of the operating temperature. At temperatures of below approximately 0° C., the internal resistance of the battery cells increases significantly, and the performance and the efficiency of the battery cells decrease continuously as temperatures fall further. In this case, irreversible damage to the battery cells may also occur. Even if the operating temperature is exceeded, the performance of the battery cells can decrease significantly. At temperatures over approximately 40° C., the service life of the battery cells is reduced. In this case, irreversible damage to the battery cells can likewise occur. Furthermore, the reliable temperature difference (temperature gradient) for the operation of the battery cells in a battery cell and/or within a battery module or a battery is typically between 5 Kelvin and 10 Kelvin. At greater temperature differences, various regions of a battery cell or various battery cells of a battery module or of a battery can be subjected to different loadings or can even be (partially) overloaded and/or damaged. Furthermore, because of temperature differences and/or temperature changes, there is a risk of condensation water forming in the battery. The damage can lead to accelerated ageing of the battery cells or to thermal runaway of the battery cells, which constitutes a risk for people and the environment.

In a hybrid drive train of a vehicle, Li-ion high performance battery cells are operated with very high dynamics. During brief peak loadings, which arise, for example, due to recuperation of braking energy during braking or boost support during acceleration, the battery cells have to absorb a high power within a very short time (during charging) or dispense a high power in a very short time (during discharging). On account of the internal resistance of the battery cells, these short peak loadings lead to a significant heating of the battery cells. The efficiency of the battery cells during charging and discharging is very high (approximately 95%); nevertheless, the waste heat which arises in the process is not negligible. At a traction power of, for example, 60 KW, a loss of 5% results in a loss of power of 3 KW. Furthermore, for example in the summer months or in warmer regions, external temperatures which may be 40° C. and more may lie outside the permissible temperature range, and therefore, without cooling, the battery cells cannot achieve a service life of, for example, ten years.

In order to ensure the reliability, functioning and service life of the battery module or battery system, it is therefore required to operate the battery cells within the predetermined temperature range. Firstly, as described above, during the operation of the battery cells, heat which has to be removed in order to avoid the battery cells heating up beyond the critical maximum temperature is produced. Secondly, at low temperatures, the battery cells may have to be heated up to a minimum temperature. In order to maintain the predetermined temperature range, the battery module or battery system is temperature-controlled, i.e. cooled or heated according to requirements.

For this purpose, the battery module or battery system can comprise a fluid, for example a liquid, such as alcohol, for example propane-1,2,3-triol (glycerol, glycerine), oil or water or a liquid mixture, as temperature control medium, for example a coolant in a temperature control medium circuit.

The cooling of the battery cells can be achieved, for example, by cooling plates on which the battery cells are mounted. In the cooling plates, either a coolant, such as cooling water (air/heat radiator) or a refrigerant, which is evaporated by the heat (evaporator), absorbs the heat of the battery cells and removes said heat via a radiator to the surroundings or to an air conditioning system (AC). In addition to the cooling plates or the evaporator and the radiator, a cooling system furthermore comprises tubes and/or pipes, for example made of plastic or metal, such as aluminum, for the connection of the cooling plates, the evaporator and/or the radiator.

WO 2012/028927 A2 discloses an electricity accumulator apparatus with a battery pack, comprising a multiplicity of battery cells, a pair of end plates and a multiplicity of clamping bands, wherein the multiplicity of battery cells is arranged between the pair of end plates, and the multiplicity of clamping bands is oriented along the multiplicity of battery cells, on the upper side and lower side thereof, and is fastened in each case to the end plates such that the multiplicity of battery cells is braced between the pair of end plates.

In order to improve the functionality of battery modules and to reduce the costs of the battery modules, the module carrier and the method for producing the module carrier therefore have to be improved.

SUMMARY OF THE INVENTION

The apparatuses and methods according to the invention have the advantage that the battery cells, for example prismatic battery cells, can be better held, protected and braced. As a result, the meeting of mechanical requirements can be improved. Furthermore, the module carrier can be modularized. As a result, the design of the module carrier can be simplified and the number of components of the module carrier reduced. Furthermore, the diversity of variants and/or scalability of the module carrier can be increased. The costs, for example production costs, storage costs, maintenance costs or commissioning costs, can therefore be reduced and resources can be protected.

In an expedient manner, when the battery cells comprise cell bases and cell covers, the first receiving region can be formed by means of a first side wall of the first carrier device, a first projection, for example a wing-like projection or tooth-like projection, which is formed on the first side wall, for guiding the cell bases, and a second projection, for example a wing-like projection or tooth-like projection, which is formed on the first side wall at a distance from the first projection, for guiding the cell covers, and the second receiving region can be formed by means of a second side wall of the second carrier device, a third projection, for example a wing-like projection or tooth-like projection, which is formed on the second side wall, for guiding the cell bases, and a fourth projection, for example a wing-like projection or tooth-like projection, which is formed on the second side wall at a distance from the third projection, for guiding the cell covers. As a result, the battery cells can be guided or held along two sides. The battery cells can therefore be securely fixed within the module carrier.

In an expedient manner, if the battery cells comprise cell terminals which are arranged on the cell covers, the second projection and the fourth projection can be designed in such a manner that they are reliably spaced apart from the cell terminals, and/or the second projection and the fourth projection can be designed in such a manner that the cell terminals are reliably concealed. As a result, secure installation and/or secure connection, for example by means of cell connectors, of the battery cells can be ensured. Furthermore, contact of the cell terminals and/or cell connectors can be prevented or at least made difficult.

In an expedient manner, the first carrier device and the second carrier device can be designed as a profile, for example a U-shaped profile or an extruded profile. The carrier devices can therefore be produced by cutting an "endless" profile to size to meet requirements. As a result, the production of the carrier devices can be simplified. Furthermore, the diversity of variants and/or scalability of the carrier devices can be increased. The costs can therefore be reduced. In an expedient manner, the length of the first carrier device and the length of the second carrier device can be adaptable along the first direction in space to the length of the battery cells in the first direction in space. The carrier devices can therefore be adapted to the dimensions and the number of battery cells. As a result, the costs can be further reduced. In an expedient manner, the first carrier device and the second carrier device can be formed from plastic and/or metal, for example aluminum. As a result, the durability and stability of the module carrier can be increased. Furthermore, the production of the module carrier can be simplified.

In an expedient manner, the first carrier device can comprise a first channel, which is formed along the first direction in space, and the second carrier device can comprise a second channel, which is formed along the first direction in space, for receiving a temperature control medium, and/or the first carrier device can comprise a third channel, which is formed along the first direction in space, and the second carrier device can comprise a fourth channel, which is formed along the first direction in space, for receiving the temperature control medium. As a result, a temperature control of the battery cells can be integrated in the module carrier. The battery cells can therefore be temperature-controlled (cooled or heated) in the module carrier. The design of module carrier and temperature control device can be simplified here. Furthermore, the use of the construction space of the module carrier can be improved.

In an expedient manner, the first connecting device can comprise a first connection channel, which is connectable to the first channel and/or to the second channel, with a first connector for the inflow or outflow of the temperature control medium. As a result, the inflow or outflow of the temperature control medium can take place through the first connecting device. The design of the carrier devices can therefore be simplified. Furthermore, the number of components of the module carrier can be limited. In an expedient manner, the first connecting device can comprise a first transfer channel which is connectable to the first channel and to the second channel, for transferring the temperature control medium. As a result, the flow of the temperature control medium through the module carrier can be simplified. The design of the carrier devices can therefore be simplified. Furthermore, the number of components of the module carrier can be limited. In an expedient manner, the first connecting device can comprise a second transfer channel, which is connectable to the third channel and to the fourth channel, for the transfer of the temperature control medium. As a result, the flow of the temperature control medium through the module carrier can be further simplified. In an expedient manner, the first connecting device can comprise a first return channel, which is connectable to the first channel and to the third channel, and a second return channel, which is connectable to the second channel and to the fourth channel, in each case for the return of the temperature control medium. As a result, the flow of the temperature control medium through the module carrier can be further simplified. In an expedient manner, the second connecting device can comprise a second connection channel, which is connectable to the first channel or to the second channel, with a second connector for the inflow or outflow of the temperature control medium. As a result, the inflow or outflow of the temperature control medium can take place through the second connecting device. The design of the carrier devices can therefore be simplified. Furthermore, the number of components of the module carrier can be limited. In an expedient manner, the second connecting device can comprise a third connection channel, which is connectable to the third channel or to the fourth channel, with a third connector for the inflow or outflow of the temperature control medium. As a result, the inflow or outflow of the temperature control medium can be improved by the second connecting device. The design of the carrier devices can therefore be simplified. Furthermore, the number of components of the module carrier can be limited. In an expedient manner, the module carrier can comprise a first connection device which comprises a fourth connection channel, which is connectable to the first channel and to the third channel, with a fourth connector for the inflow or outflow of the temperature control medium. As a result, the inflow or outflow of the temperature control medium can take place through the first connection device. The design of the connecting devices can therefore be simplified. In an expedient manner, the module carrier can comprise a second connection device which comprises a fifth connection channel, which is connectable to the second channel and to the fourth channel, with a fifth connector for the inflow or outflow of the temperature control medium. As a result, the inflow or outflow of the temperature control medium can take place through the second connection device. The design of the connecting devices can therefore be further simplified. In an expedient manner, the module carrier can comprise seals for sealing a circuit of the temperature control medium. As a result, intersections between the channels, connection channels, transfer channels and return channels can be sealed.

In an expedient manner, the module carrier can furthermore comprise a baseplate, for example a baseplate comprising a further channel for receiving the temperature control medium, wherein the first connecting device and the second connecting device are connected to the baseplate in such a manner that the baseplate is arranged between the first carrier device and the second carrier device. As a result, the meeting of the mechanical requirements can be further improved. Furthermore, the temperature control of the battery cells in the module carrier can optionally be improved.

In an expedient manner, the first carrier device, the second carrier device, the first connecting device and/or the second connecting device can comprise fastening devices, for example fastening holes, for fastening the module carrier. As a result, the installation of the module carrier can be simplified.

The invention provides a battery module which comprises the previously described module carrier and the previously described battery cells. The invention provides a battery pack which comprises the previously described module carrier or the previously described battery module. The invention provides a battery which comprises the previously described module carrier, the previously described battery module or the previously described battery pack. The invention provides a battery system which comprises the previously described module carrier, the previously described battery module, the previously described battery pack or the previously described battery.

The invention furthermore provides a vehicle, in particular motor vehicle, such as an electric motor vehicle, hybrid vehicle or electric motorbike (electric bike, E-bike), electric bicycle (pedal electric cycle, pedelec), a seacraft, such as an electric boat, an aircraft or a space vehicle, which comprises the previously described module carrier connected to the vehicle, the previously described battery module connected to the vehicle, the previously described battery pack connected to the vehicle, the previously described battery connected to the vehicle, or the previously described battery system connected to the vehicle.

In an expedient manner, when the battery cells comprise cell bases and cell covers, the first receiving region can be formed by means of a first side wall of the first carrier device, a first projection, for example a wing-like projection or tooth-like projection, which is formed on the first side wall, for guiding the cell bases, and a second projection, for example a wing-like projection or tooth-like projection, which is formed on the first side wall at a distance from the first projection, for guiding the cell covers, and the second receiving region can be formed by means of a second side wall of the second carrier device, a third projection, for example a wing-like projection or tooth-like projection, which is formed on the second side wall, for guiding the cell bases, and a fourth projection, for example a wing-like projection or tooth-like projection, which is formed on the second side wall at a distance from the third projection, for guiding the cell covers. As a result, the battery cells can be guided or held along two sides. The battery cells can therefore be securely fixed within the module carrier.

In an expedient manner, if the battery cells comprise cell terminals which are arranged on the cell covers, the second projection and the fourth projection can be designed in such a manner that they are reliably spaced apart from the cell terminals, and/or the second projection and the fourth projection can be designed in such a manner that the cell terminals are reliably concealed. As a result, secure installation and/or secure connection, for example by means of cell connectors, of the battery cells can be ensured. Furthermore, contact of the cell terminals and/or cell connectors can be prevented or at least made difficult.

In an expedient manner, the first carrier device and the second carrier device can be designed as a profile, for example a U-shaped profile or an extruded profile. The carrier devices can therefore be produced by cutting an "endless" profile to size to meet requirements. As a result, the production of the carrier devices can be simplified. Furthermore, the diversity of variants and/or scalability of the carrier devices can be increased. The costs can therefore be reduced. In an expedient manner, the length of the first carrier device and the length of the second carrier device can be adapted along the first direction in space to the length of the battery cells in the first direction in space. The carrier devices can therefore be adapted to the dimensions and the number of battery cells. As a result, the costs can be further reduced. In an expedient manner, the first carrier device and the second carrier device can be formed from plastic and/or metal, for example aluminum. As a result, the durability and stability of the module carrier can be increased. Furthermore, the production of the module carrier can be simplified.

In an expedient manner, the first carrier device can comprise a first channel, which is formed along the first direction in space, and the second carrier device can comprise a second channel, which is formed along the first direction in space, for receiving a temperature control medium, and/or the first carrier device can comprise a third channel, which is formed along the first direction in space, and the second carrier device can comprise a fourth channel, which is formed along the first direction in space, for receiving the temperature control medium. As a result, a temperature control of the battery cells can be integrated in the module carrier. The battery cells can therefore be temperature-controlled (cooled or heated) in the module carrier. The design of module carrier and temperature control device can be simplified here. Furthermore, the use of the construction space of the module carrier can be improved.

In an expedient manner, the first connecting device can comprise a first connection channel, which is connected to the first channel or to the second channel, with a first connector for the inflow or outflow of the temperature control medium. As a result, the inflow or outflow of the temperature control medium can take place through the first connecting device. The design of the carrier devices can therefore be simplified. Furthermore, the number of components of the module carrier can be limited. In an expedient manner, the first connecting device can comprise a first transfer channel which is connected to the first channel and to the second channel, for transferring the temperature control medium. As a result, the flow of the temperature control medium through the module carrier can be simplified. The design of the carrier devices can therefore be simplified. Furthermore, the number of components of the module carrier can be limited. In an expedient manner, the first connecting device can comprise a second transfer channel, which is connected to the third channel and to the fourth channel, for the transfer of the temperature control medium. As a result, the flow of the temperature control medium through the module carrier can be further simplified. In an expedient manner, the first connecting device can comprise a first return channel, which is connected to the first channel and to the third channel, and a second return channel, which is connected to the second channel and to the fourth channel, in each case for the return of the temperature control medium. As a result, the flow of the temperature control medium through the module carrier can be further simplified. In an expedient manner, the second connecting device can comprise a second connection channel, which is connected to the first channel or to the second channel, with a second connector for the inflow or outflow of the temperature control medium. As a result, the inflow or outflow of the temperature control medium can take place through the second connecting device. The design of the carrier devices can therefore be simplified. Furthermore, the number of components of the module carrier can be limited. In an expedient manner, the second connecting device can comprise a third connection channel, which is connected to the third channel or to the fourth channel, with a third connector for the inflow or outflow of the temperature control medium. As a result, the inflow or outflow of the temperature control medium can be improved by the second connecting device. The design of the carrier devices can therefore be simplified. Furthermore, the number of components of the module carrier can be limited. In an expedient manner, the module carrier can comprise a first connection device which comprises a fourth connection channel, which is connected to the first channel and to the third channel, with a fourth connector for the inflow or outflow of the temperature control medium. As a result, the inflow or outflow of the temperature control medium can take place through the first connection device. The design of the connecting devices can therefore be simplified. In an expedient manner, the module carrier can comprise a second connection device which comprises a fifth connection channel, which is connected to the second channel and to the fourth channel, with a fifth connector for the inflow or outflow of the temperature control medium. As a result, the inflow or outflow of the temperature control medium can take place through the second connection device. The design of the connecting devices can therefore be further simplified. In an expedient manner, the module carrier can comprise seals for sealing a circuit of the temperature control medium. As a result, intersections between the channels, connection channels, transfer channels and return channels can be sealed.

In an expedient manner, the method can furthermore comprise providing a baseplate, for example a baseplate comprising a further channel for receiving the temperature control medium, wherein the first connecting device and the second connecting device are connected to the baseplate in such a manner that the baseplate is arranged between the first carrier device and the second carrier device. As a result, the meeting of the mechanical requirements can be further improved. Furthermore, the temperature control of the battery cells in the module carrier can optionally be improved.

In an expedient manner, the first carrier device, the second carrier device, the first connecting device and/or the second connecting device can comprise fastening devices or fastening holes, for fastening the module carrier. As a result, the installation of the module carrier can be simplified.

BRIEF DESCRIPTION OF THE DRAWINGS

Exemplary embodiments of the invention are illustrated in the drawings and are explained in more detail in the description below.

In the drawings.

DETAILED DESCRIPTION

Figure 1:
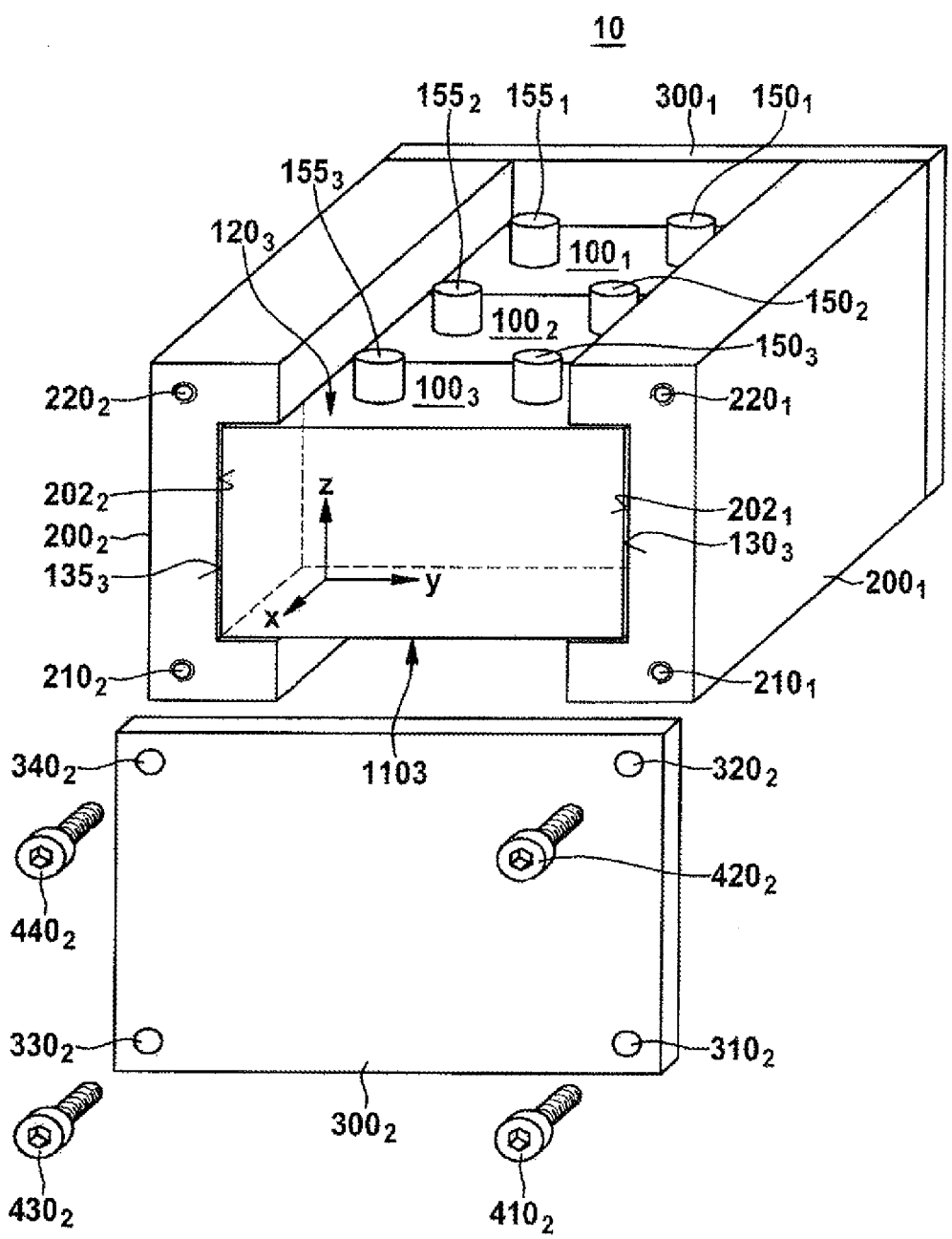
FIG. 1 shows a schematic perspective view of an open battery module 10 according to one embodiment of the invention.

FIG. 1 shows a schematic perspective view of an open battery module 10 according to one embodiment of the invention.

The battery module 10 comprises a multiplicity of battery cells $100_1$, $100_2$, $100_3$, for example two, three, four or more battery cells. As shown by way of example in FIG. 1, the battery cells $100_1$, $100_2$, $100_3$ are oriented in a first direction in space (x) such that the longitudinal sides thereof, which are oriented in a second direction in space (y) perpendicular to the first direction in space (x), run parallel to one another. A third direction in space (z) which is perpendicular to the first direction in space (x) and second direction in space (y) denotes the vertical direction of the battery cells $100_1$, $100_2$, $100_3$ during use according to the specifications.

The battery cells $100_1$, $100_2$, $100_3$ can be prismatic, for example cuboidal, and can each comprise a cell housing and a cell cover with in each case two electric cell terminals $150_1$, $155_1$, $150_2$, $155_2$, $150_3$, $155_3$, for example made of aluminum or copper. For the electrical connection, the electric cell terminals can, for example, each comprise a threaded hole. For the electrical connection of the battery cells $100_1$, $100_2$, $100_3$ to form a battery module, use can be made of connecting pieces, for example cell connectors, for example made of aluminum or copper, which electrically connect the cell terminals of the battery cells $100_1$, $100_2$, $100_3$ to one another in accordance with the particular requirement. For the production of the battery module, the connecting pieces can be welded, for example according to the spatial orientation of the battery cells $100_1$, $100_2$, $100_3$, to the cell terminals, for example by means of a laser.

The battery cells $100_1$, $100_2$, $100_3$ can be designed as primary cells or primary elements, which are not rechargeable, or as secondary cells, which are rechargeable. The secondary cells can be designed, for example, as lithium-ion storage batteries (lithium storage batteries, lithium-ion storage batteries, Li-ion storage batteries, Li-ion secondary batteries) or lithium-polymer storage batteries (LiPoly storage batteries, LiPo storage batteries). The battery cells $100_1$, $100_2$, $100_3$ can be designed with an electrode roll (jelly roll, JR, swiss roll), for example in the form of a lithium-ion storage battery with an electrode roll (JR-Li-ion storage battery). The battery cells $100_1$, $100_2$, $100_3$ can be designed as a pouch cell. In this case, a pouch which serves for receiving and storing an electrolyte can comprise one, two, three or more electrode rolls. Furthermore, a protective envelope can enclose the electrode roll or the electrode rolls and/or the pouch or the pouches. The protective envelope can comprise a durable (impact resistant, bulletproof, shot proof, bombardment proof, ballistic, anti-ballistic) material, for example a ballistic fabric, such as a ballistic polyamide fabric (ballistic nylon fabric, ballistic nylon). The electrode rolls can therefore be protected against damage from the outside, for example in the event of an accident, and/or in the event of thermal runaway of an electrode roll, which can exert considerable forces on adjacent battery cells.

The battery module 10 furthermore comprises a first carrier device $200_1$ comprising a first receiving region $202_1$, and a second carrier device $200_2$, which is arranged opposite the first carrier device $200_1$, comprising a second receiving region $202_2$ for carrying the battery cells $100_1$, $100_2$, $100_3$. The carrier devices $200_1$, $200_2$ are preferably of identical design. The carrier devices $200_1$, $200_2$ can be designed as side parts. As shown by way of example in FIG. 1, the carrier devices $200_1$, $200_2$ and/or the receiving regions $202_1$, $202_2$ can be of U-shaped design such that they enclose the battery cells $100_1$, $100_2$, $100_3$ at the cell bases, for example by means of a base-side projection or limb, and at the cell covers, for example by means of a cover-side projection or limb. The bottom-side projection and/or the bottom-side projections can be toothed, for example in a ratio of 50:50, such that the quantity of material and therefore the weight can be reduced. The carrier devices $200_1$, $200_2$ can be designed as a profile, for example U-shaped profile, extruded profile or endless profile. The length of the carrier devices $200_1$, $200_2$ along the first direction in space (x) can be adapted to the length of the battery cells $100_1$, $100_2$, $100_3$ in the first direction in space (x) such that the module carrier is scalable with respect to the number of battery cells $100_1$, $100_2$, $100_3$. The carrier devices $200_1$, $200_2$ can be formed from plastic or metal, for example aluminum or an aluminum alloy. The carrier devices $200_1$, $200_2$ are arranged in such a manner that the receiving regions $202_1$, $202_2$ are arranged opposite each other and the battery cells $100_1$, $100_2$, $100_3$ are enclosed along the first direction in space (x) at least partially in the manner of a clamp. The carrier devices $200_1$, $200_2$ can be designed in such a manner that they are reliably spaced apart from the cell terminals $150_1$, $150_2$, $150_3$, $155_1$, $155_2$, $155_3$ and/or the cell terminals $150_1$, $150_2$, $150_3$, $155_1$, $155_2$, $155_3$ are reliably concealed.

The battery module 10 furthermore comprises a first connecting device $300_1$ and a second connecting device $300_2$, which is arranged opposite the first connecting device $300_1$, for connecting the carrier devices $200_1$, $200_2$ to each other. The connecting devices $300_1$, $300_2$ are preferably of identical design. The connecting devices $300_1$, $300_2$ can be designed as end plates or terminating plates. The connecting devices $300_1$, $300_2$ can be formed from plastic or metal, for example aluminum or an aluminum alloy.

The connecting devices $300_1$, $300_2$ are connected to the carrier devices $200_1$, $200_2$ in such a manner that the multiplicity of battery cells $100_1$, $100_2$, $100_3$ are fixed and/or braced in the module carrier. For this purpose, as shown by way of example in FIG. 1, the carrier devices $200_1$, $200_2$ and the connecting devices $300_1$, $300_2$ can comprise holes $210_1$, $220_1$, $210_2$, $220_2$ or $310_2$, $320_2$, $330_2$, $340_2$. The holes $210_1$, $220_1$, $210_2$, $220_2$ of the carrier devices $200_1$, $200_2$ may be in the form of threaded holes. The connecting devices $300_1$, $300_2$ can be screwed to the carrier devices $200_1$, $200_2$, for example by screws $410_2$, $420_2$, $430_2$, $440_2$, such as head screws, flat head screws or countersunk head screws, threaded rods, threaded bolts and/or nuts. Alternatively, the connecting devices $300_1$, $300_2$ can be riveted to the carrier devices $200_1$, $200_2$ by means of rivets. Furthermore, the connecting devices $300_1$, $300_2$ can be welded or adhesively bonded to the carrier devices $200_1$, $200_2$.

The production of the battery module 10 can comprise cutting the carrier devices $200_1$, $200_2$ to size depending on the number of battery cells $100_1$, $100_2$, $100_3$ and/or the dimensions thereof. The production comprises inserting the battery cells $100_1$, $100_2$, $100_3$ into or between the carrier devices $200_1$, $200_2$ and connecting the carrier devices $200_1$, $200_2$ by means of the first connecting devices $300_1$. These steps can be carried out in a different sequence. The production furthermore comprises connecting the carrier devices $200_1$, $200_2$ by means of the second connecting devices $300_2$.

Figure 2:
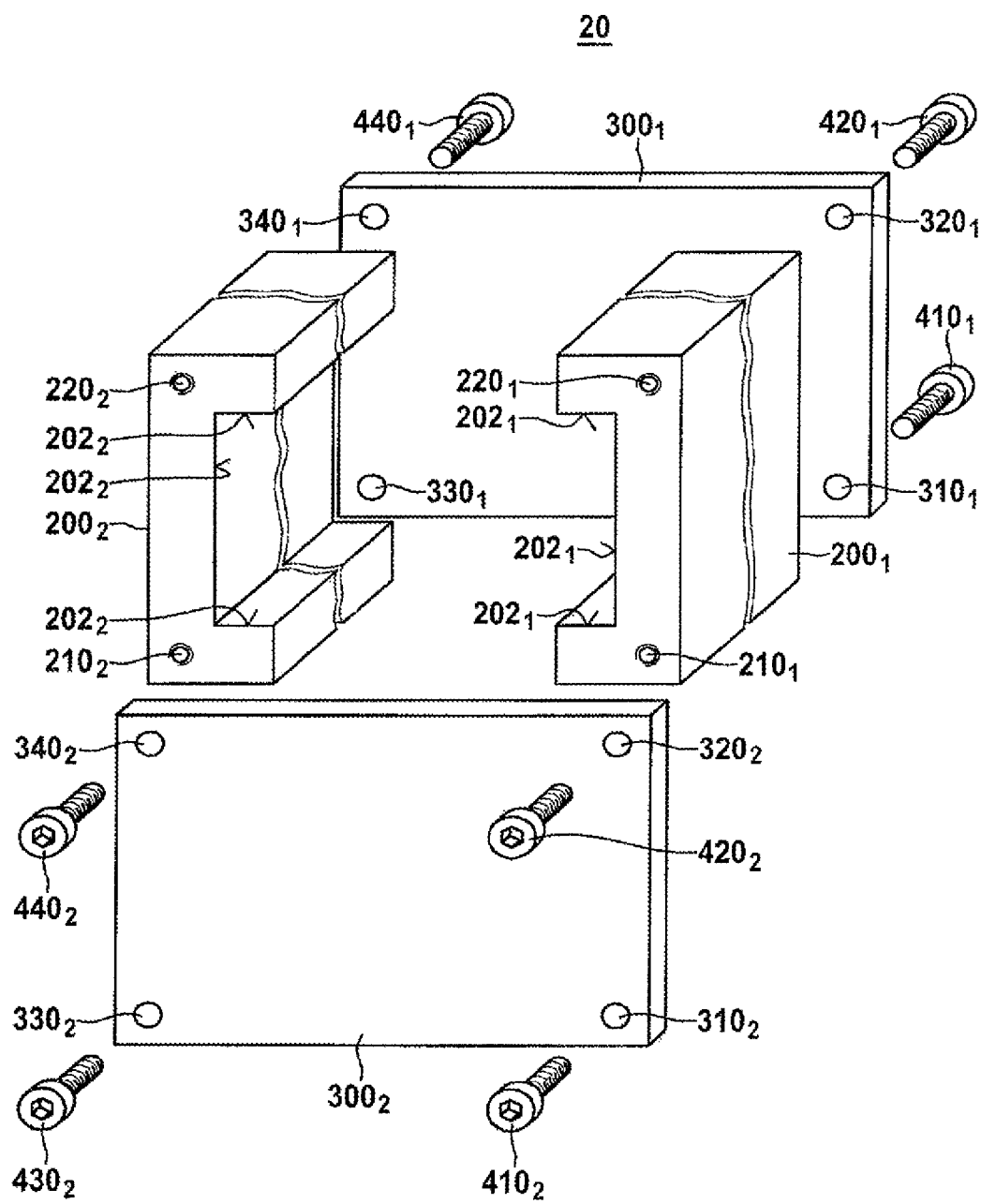
FIG. 2 shows a schematic perspective exploded view of a module carrier 20 according to the embodiment of the invention.

FIG. 2 shows a schematic perspective exploded view of a module carrier 20 according to the embodiment of the invention.

The module carrier 20 corresponds to the module carrier described with respect to FIG. 1. FIG. 2 also shows the second connecting device $300_2$, comprising holes $310_1$, $320_1$, $330_1$, $340_1$ and screws $410_1$, $420_1$, $440_1$, and thus clarifies the modular design thereof. The carrier devices $200_1$, $200_2$ are illustrated in shortened form in comparison to FIG. 1. The lengths of said carrier devices in the first direction in space (x) can be adapted to the dimensions and the number of battery cells, and therefore the module carrier 20 is scalable with respect to the number of battery cells.

Figure 3:
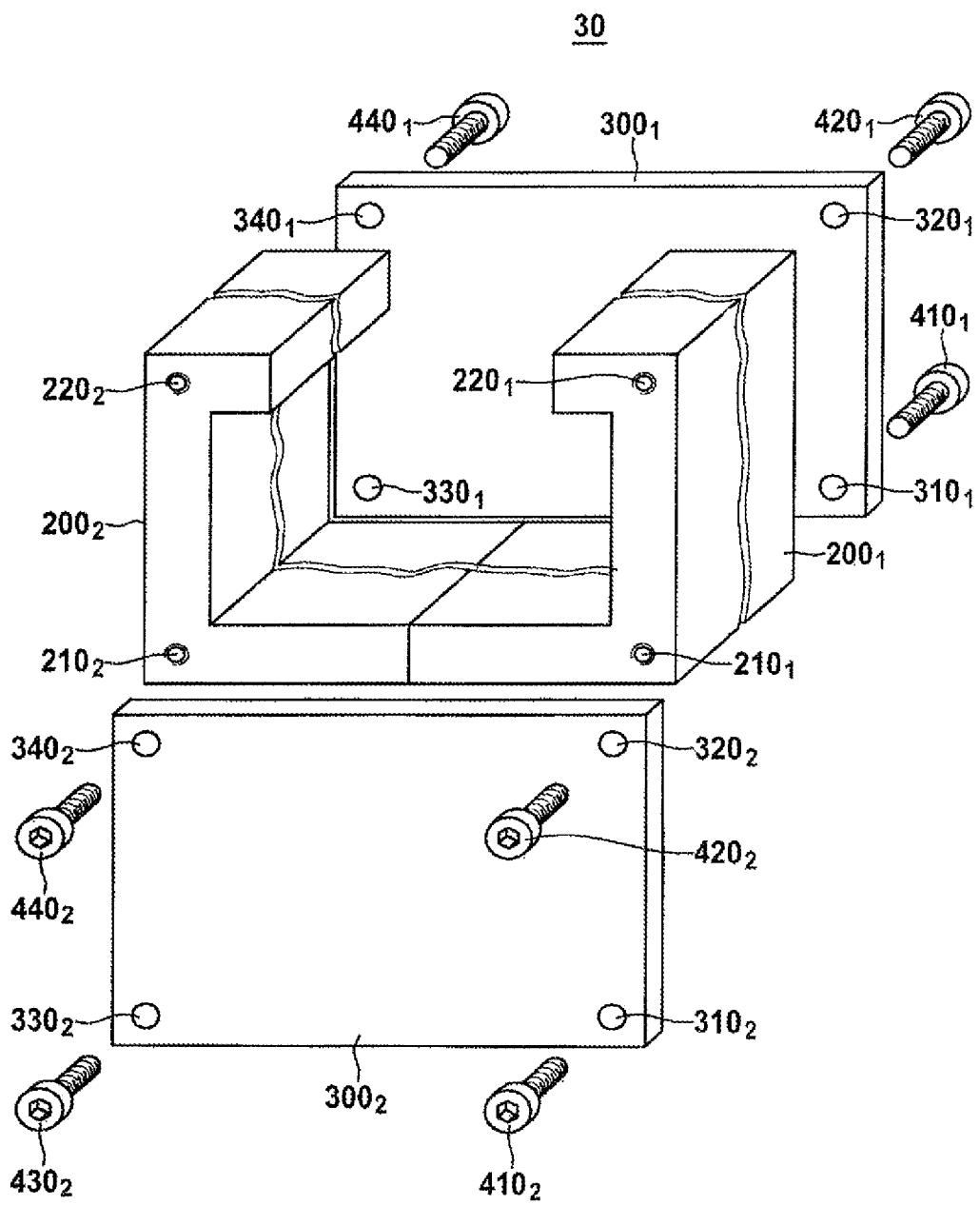
FIG. 3 shows a schematic perspective exploded view of a module carrier 30 according to another embodiment of the invention.

FIG. 3 shows a schematic perspective exploded view of a module carrier 30 according to another embodiment of the invention.

The module carrier 30 corresponds to the module carrier described with respect to FIG. 1. The base-side limbs of the carrier devices $200_1$, $200_2$ are designed to be longer than the cover-side limbs of the carrier devices $200_1$, $200_2$, and therefore the cell bases of the battery cells are enclosed and protected. The carrier devices $200_1$, $200_2$ and the connecting devices $300_1$, $300_2$ here can comprise further holes for fastening purposes in the region of the extended, base-side limbs.

Figure 4:
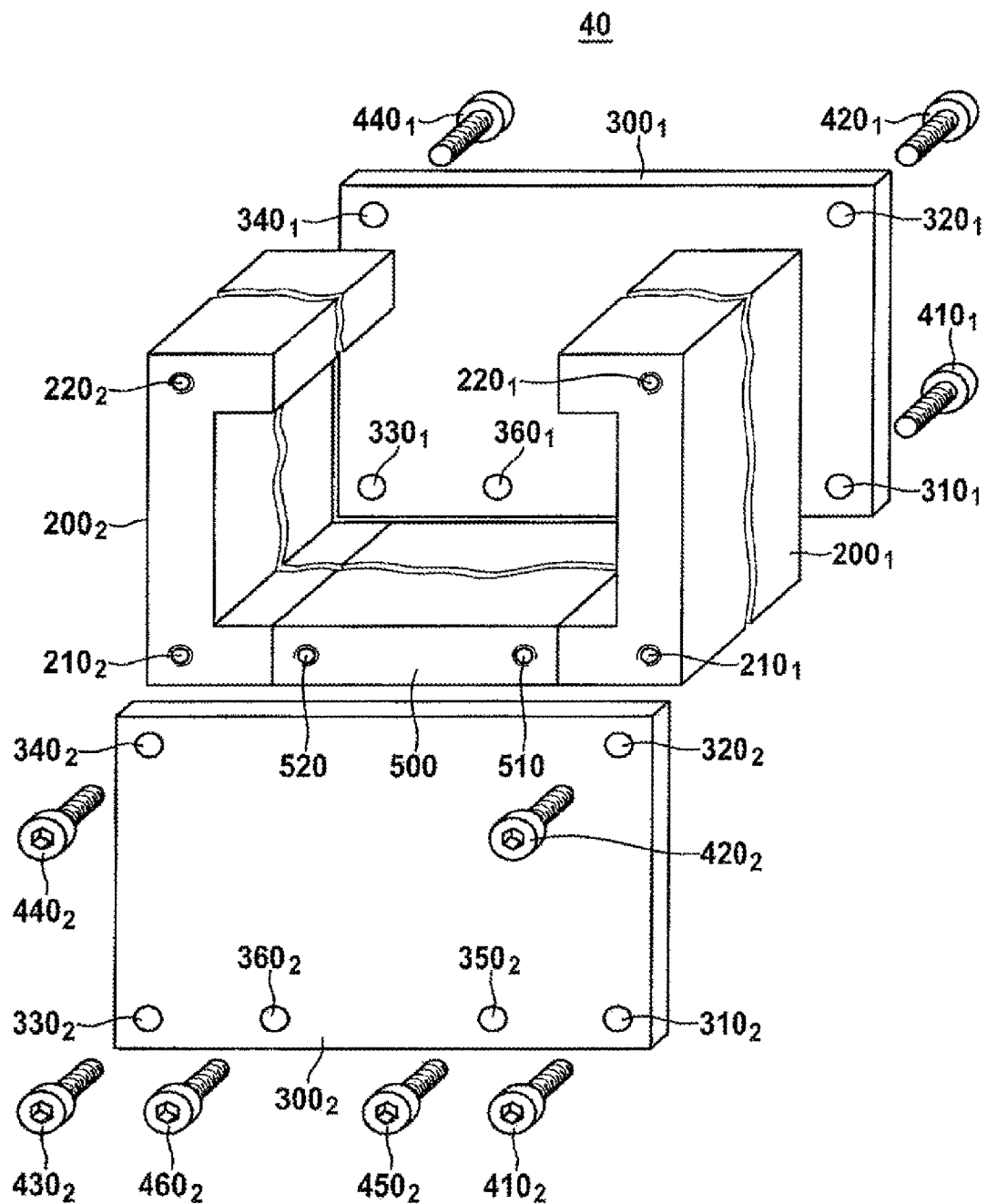
FIG. 4 shows a schematic perspective exploded view of a module carrier 40 according to another embodiment of the invention.

FIG. 4 shows a schematic perspective exploded view of a module carrier 40 according to another embodiment of the invention.

The module carrier 40 corresponds to the module carrier described with respect to FIG. 1. The module carrier 40 furthermore comprises a baseplate 500 which is arranged between the carrier devices $200_1$, $200_2$ such that the cell bases of the battery cells are enclosed and protected. The baseplate 500 can comprise holes 510, 520. The holes 510, 520 in the baseplate 500 can be designed, as described above, as threaded holes. The connecting devices $300_1$, $300_2$ can comprise further holes $360_1$, $350_2$, $360_2$ such that said connecting devices can be screwed to the baseplate 500, for example, by means of screws $450_2$, $460_2$, threaded rods, threaded bolts and/or nuts.

Figure 5:
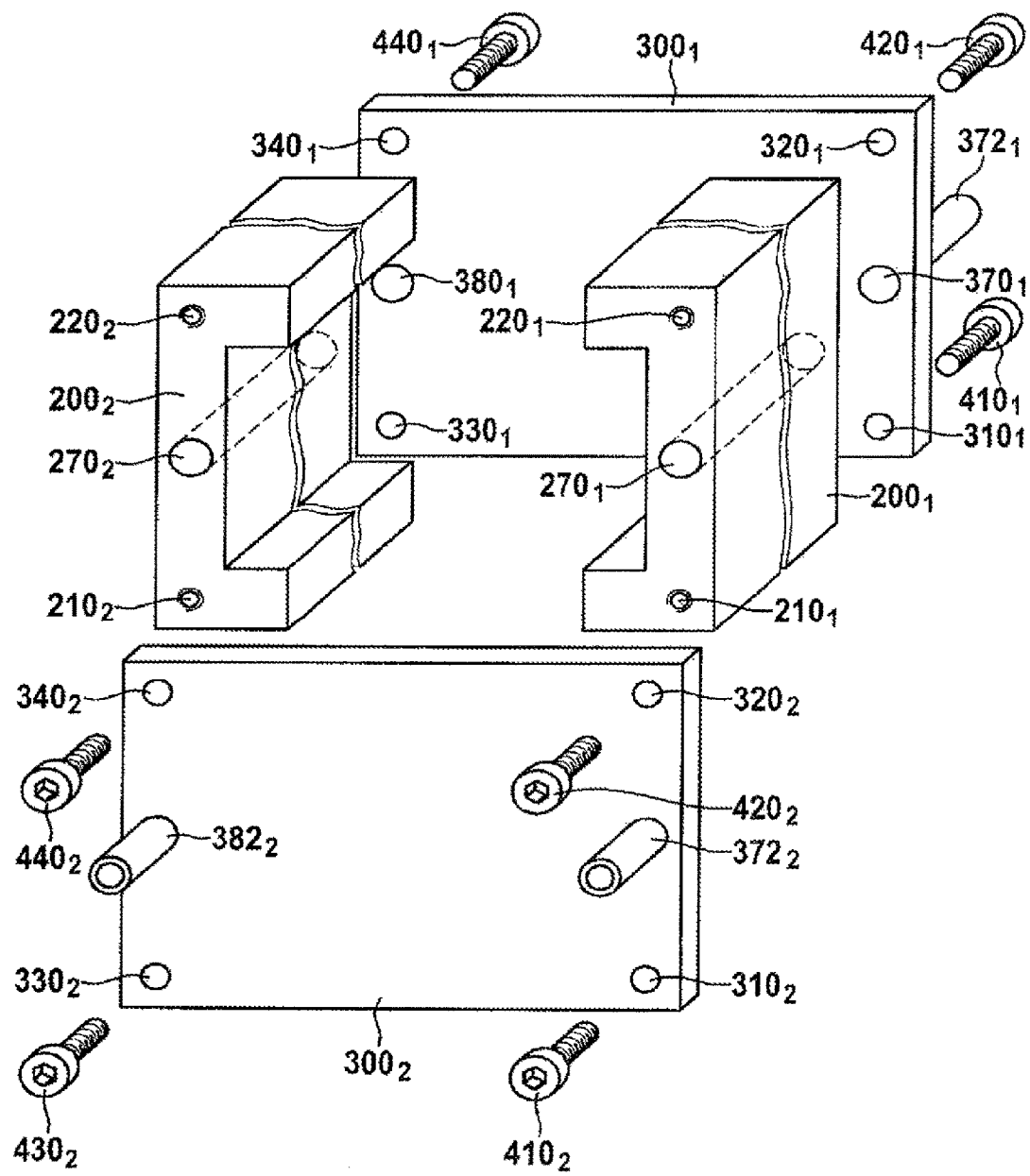
FIG. 5 shows a schematic perspective exploded view of a module carrier 50 according to another embodiment of the invention.

FIG. 5 shows a schematic perspective exploded view of a module carrier 50 according to another embodiment of the invention.

The module carrier 50 corresponds to the module carrier described with respect to FIG. 1 and is designed for controlling the temperature of the battery cells. For this purpose, the first carrier device $200_1$ comprises a channel $270_1$, which is substantially formed along the first direction in space (x), for receiving a temperature control medium. The temperature control medium can comprise a fluid, for example a liquid, such as alcohol, for example propane-1,2,3-triol (glycerol, glycerin), oil or water or a liquid mixture. As shown by way of example in FIG. 5, the channel $270_1$ can have a round cross section. Alternatively, the channel $270_1$ can have an oval, rectangular, rounded rectangular or square cross section. The channel $270_1$ can be of rectilinear or wavy design, such as sinusoidal design, along the first direction in space (x). The first connecting device $300_1$ comprises a connection channel $370_1$, which is connectable to the channel $270_1$ and comprises a connector $372_1$ for the inflow or outflow of the temperature control medium, and the second connecting device $300_2$ comprises a connection channel, which is connectable to the first channel $270_1$ and comprises a connector $372_2$ for the outflow or inflow of the temperature control medium. The connection channels can be formed in the interior of the connecting devices $300_1$, $300_2$ and can each comprise an opening which is adapted with respect to cross section, size and/or position to the channel $270_1$ such that the connection channels are connectable to the channel $270_1$. As shown by way of example in FIG. 5, the connectors $372_1$, $372_2$ can be arranged on the connecting devices $300_1$, $300_2$, for example along the first direction in space (x). The connectors $372_1$, $372_2$ can be designed, for example, as connecting branches, threaded connecting branches or olives. The connectors $372_1$, $372_2$ can be connected to a temperature control system. The battery cells can therefore be temperature-controlled by means of the temperature control medium flowing through the first channel $270_1$. The module carrier 50 can furthermore comprise sealing devices (not shown), for example seals, such as sealing rings, sealing washers or sealing plates, or a sealing compound, for the sealing, for example pressure-proof or hydraulically tight sealing, of transitions between the channels.

Accordingly, as shown in FIG. 5, the second carrier device $200_2$ can comprise a channel $270_2$, the first connecting device $300_1$ can comprise a further connection channel $380_1$, which is connectable to this channel $270_2$ and comprises a further connector, and the second connecting device $300_2$ can comprise a further connection channel, which is connectable to this channel $270_2$ and comprises a connector $382_2$.

Figure 6:
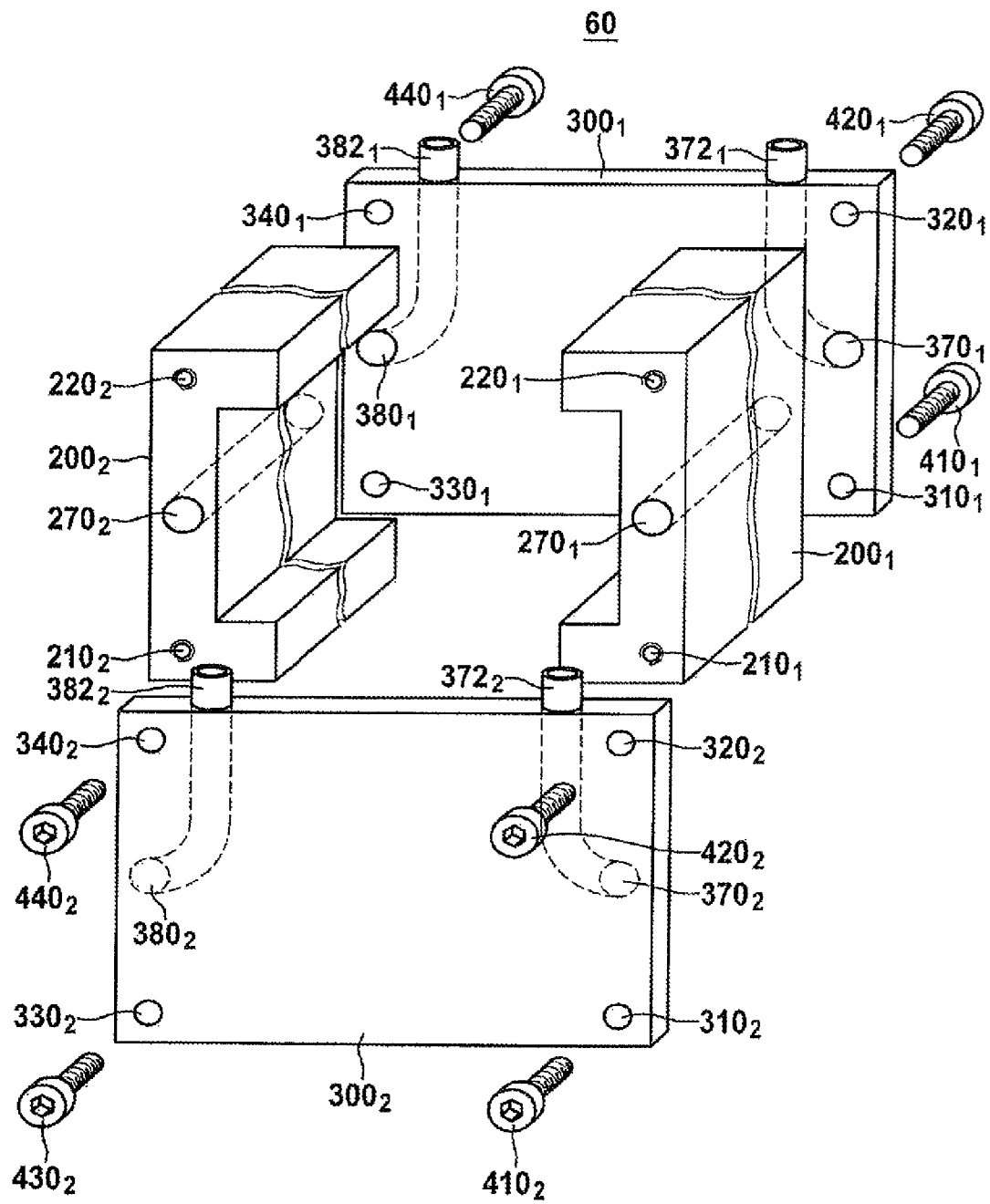
FIG. 6 shows a schematic perspective exploded view of a module carrier 60 according to another embodiment of the invention.

FIG. 6 shows a schematic perspective exploded view of a module carrier 60 according to another embodiment of the invention.

The module carrier 60 corresponds to the module carrier 50 described with respect to FIG. 5. As shown by way of example in FIG. 6, the connectors $372_1$, $382_1$, $272_2$, $382_2$ can be arranged on the connecting devices $300_1$, $300_2$ along the third direction in space (z), for example on an upper side, with respect to the use according to the specifications. For this purpose, the connection channels $370_1$, $380_1$, $370_2$, $380_2$ run substantially along the third direction in space (z) in the connecting devices $300_1$, $300_2$.

Figure 7:
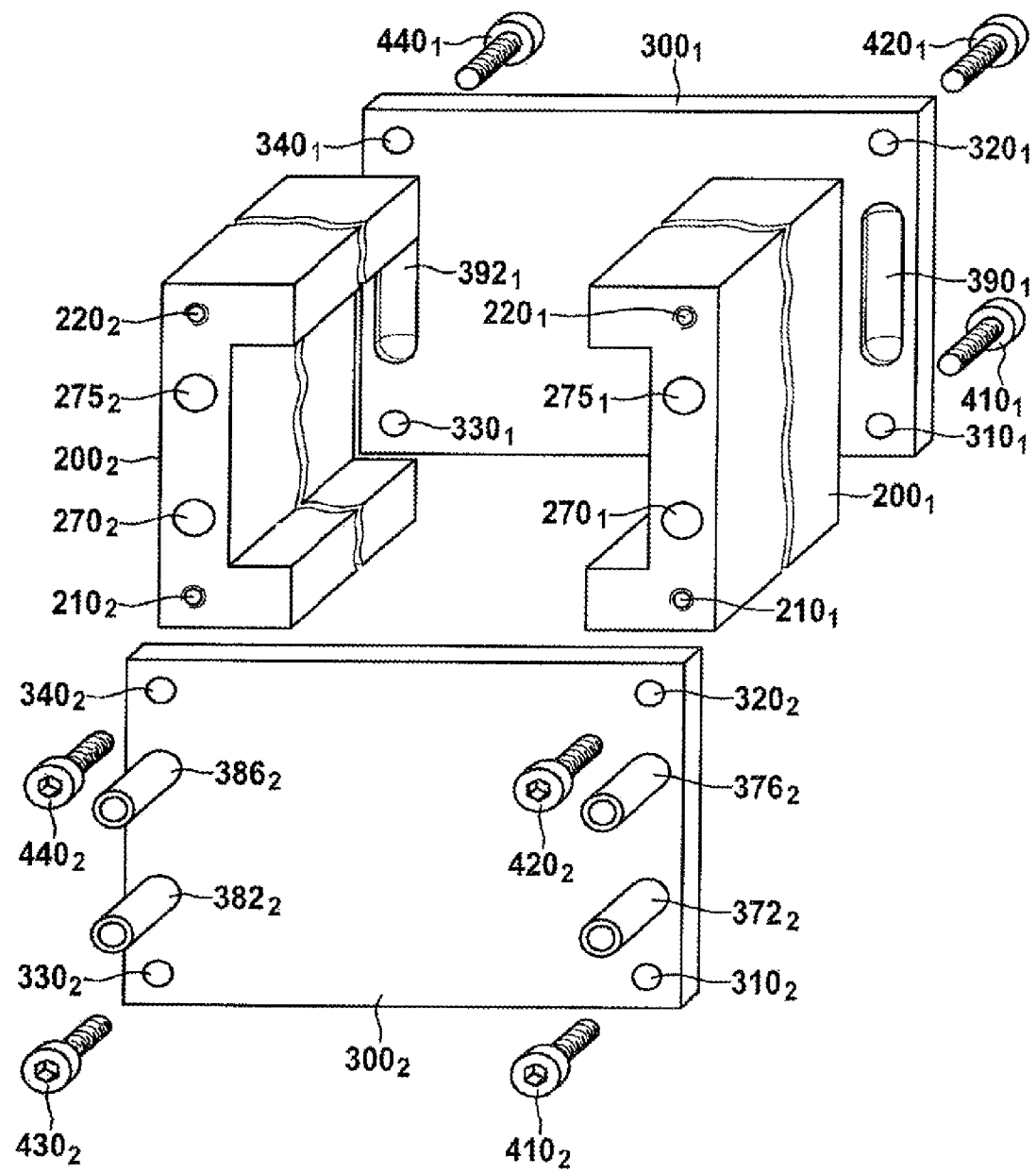
FIG. 7 shows a schematic perspective exploded view of a module carrier 70 according to another embodiment of the invention.

FIG. 7 shows a schematic perspective exploded view of a module carrier 70 according to another embodiment of the invention.

The module carrier 70 is similar to the module carrier 50 described with respect to FIG. 5. In addition to the channel $270_1$, the first carrier device $200_1$ comprises a further channel $275_1$, which is likewise formed substantially along the first direction in space (x), preferably substantially parallel, with respect to the first direction in space (x), above and below the channel $270_1$, in order to receive the temperature control means such that the temperature control of the battery cells can be improved.

However, in this embodiment, the first connecting device $300_1$ comprises a return channel $390_1$, which is connectable to the channel $270_1$ and to the further channel $275_1$, for the return of the temperature control medium which, first of all, for example, coming from the second connecting device $300_2$ flows via the channel $270_1$ through the first carrier device $200_1$ and subsequently, now coming from the first connecting device $300_1$, flows once again through the first carrier device $200_1$ via the further channel $275_1$. As shown by way of example in FIG. 7, the return channel $390_1$ can be designed as a depression or trench. Alternatively, the return channel $390_1$ can be formed in the interior of the first connecting device $300_1$ and can comprise two openings which are spaced apart from each other.

The second connecting device $300_2$ comprises a further connection channel, which is connectable to the second channel $275_1$ and comprises a further connector $376_2$ for the outflow or inflow of the temperature control medium. As shown by way of example in FIG. 7, the connectors $372_2$, $376_2$ can be arranged on the second connecting device $300_2$, for example along the first direction in space (x).

Accordingly, as shown in FIG. 7, the second carrier device $200_2$ can comprise a further channel $275_2$, the first connecting device $300_1$ can comprise a further return channel $392_1$, which is connectable to the channel $270_2$ and to the further channel $275_2$ of the second carrier device $200_2$, and the second connecting device $300_2$ can comprise a further connection channel, which is connectable to the further channel $275_2$ of the second carrier device $200_2$ and comprises a connector $386_2$.

Figure 8:
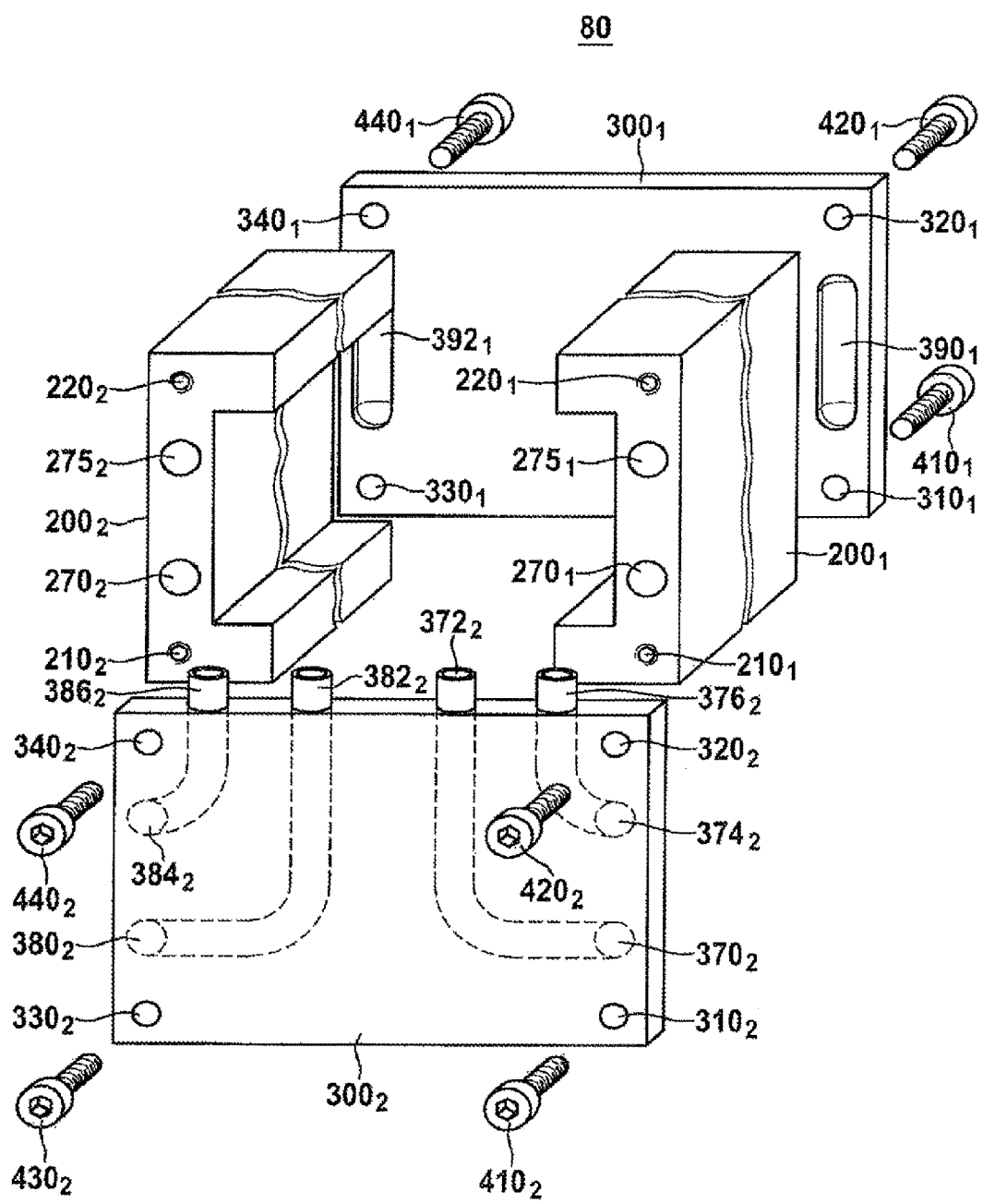
FIG. 8 shows a schematic perspective exploded view of a module carrier 80 according to another embodiment of the invention.

FIG. 8 shows a schematic perspective exploded view of a module carrier 80 according to another embodiment of the invention.

The module carrier 80 corresponds to the module carrier 70 described with respect to FIG. 7. As shown by way of example in FIG. 8, the connectors $372_2$, $376_2$, $282_2$, $386_2$ can be arranged on the second connecting device $300_2$ along the third direction in space (x), for example on the upper side. For this purpose, the connection channels $370_1$, $380_1$, $370_2$, $380_2$ run substantially along the third direction in space (z) in the connecting devices $300_1$, $300_2$.

Figure 9:
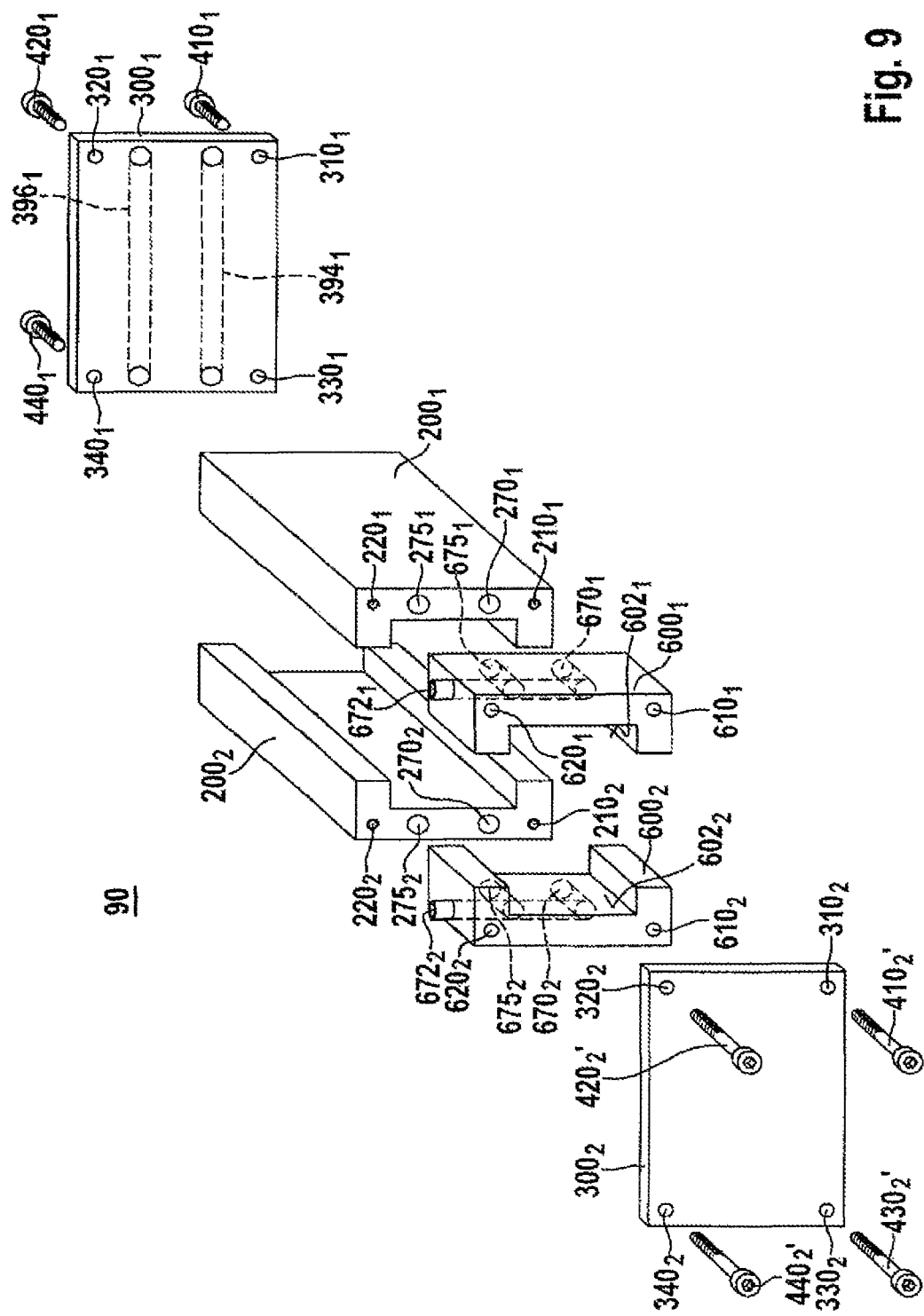
FIG. 9 shows a schematic perspective exploded view of a module carrier 90 according to another embodiment of the invention.

FIG. 9 shows a schematic perspective exploded view of a module carrier 90 according to another embodiment of the invention.

The module carrier 90 is similar to the module carrier 70 described with respect to FIG. 7; the carrier devices $200_1$, $200_2$ in each case comprise two channels $270_1$, $275_1$, $270_2$, $275_2$ for receiving the temperature control medium.

However, in this embodiment, the first connecting device $300_1$ comprises a transfer channel $394_1$, which is connectable to the channels $270_1$, $270_2$ of the carrier device $200_1$, $200_2$, for the transfer of the temperature control medium which, for example, first of all, coming from the direction of the second connecting device $300_2$, flows via the channel $270_1$ through the first carrier device $200_1$ and subsequently, then coming from the first connecting device $300_1$, flows through the second carrier device $200_2$ via the channel $270_2$. As shown in FIG. 7, the transfer channel $394_1$ can be formed in the interior of the first connecting device $300_1$ and can comprise two openings which are spaced apart from each other. The temperature control of a battery cell which is arranged adjacent to the first connecting device $300_1$ can be improved by the transfer channel $394_1$.

Accordingly, the first connecting device $300_1$ can comprise a further transfer channel $396_1$, which is connectable to the further channels $275_1$, $275_2$ of the carrier device $200_1$, $200_2$, for the transfer of the temperature control medium which, for example, first of all, coming from the direction of the second connecting device $300_2$, flows via the further channel $275_1$ through the first carrier device $200_1$ and subsequently, then coming from the first connecting device $300_1$, flows through the second carrier device $200_2$ via the further channel $275_2$.

Depending on the design of the module carrier 90 on the part of the second connecting device $300_2$, for example when the second connecting device $300_2$, which is described with respect to FIG. 8, is used with four connectors $372_2$, $376_2$, $282_2$, $386_2$, the temperature control medium can flow through the transfer channels $294_1$, $296_1$ in different, opposite directions, and therefore the temperature control becomes more uniform.

The module carrier 90 can furthermore comprise a first connection device $600_1$ which comprises a connection channel $670_1$, $675_1$, which is connectable to the channel $270_1$ and/or to the further channel $275_1$ of the first carrier device $200_1$, and a connector $672_1$, for the inflow or outflow of the temperature control medium. The first connection device $600_1$ is arranged between the first carrier device $200_1$ and the second connecting device $300_2$ such that the second connecting device $300_2$, which is described with respect to FIG. 1 and does not comprise any channels and/or connectors, can be used. The first connection device $600_1$ comprises a receiving region $602_1$ which is adapted with respect to cross section, size and/or position to the first receiving region $202_1$ of the first carrier device $200_1$. The length of the first carrier device $200_1$ in the first direction in space (x) can be shortened by the length of the first connection device $600_1$. The screws $410_2'$, $420_2'$ can be adapted with respect to the length thereof, and therefore the second connecting device $300_2$ can be screwed to the first carrier device $200_1$.

In a corresponding manner, the module carrier 90 can comprise a second connection device $600_2$ which comprises a connection channel $670_2$, $675_2$, which is connectable to the channel $270_2$ and/or to a further channel $275_2$ of the second carrier device $200_2$, and a connector $672_2$, and also a receiving region $602_2$ and holes $610_2$, $620_2$, for the inflow or outflow of the temperature control medium. The connection devices $600_1$, $600_2$ can be of identical design. Furthermore, the screws $430_2'$, $440_2'$ can be adapted with respect to the length thereof.

Figure 10:
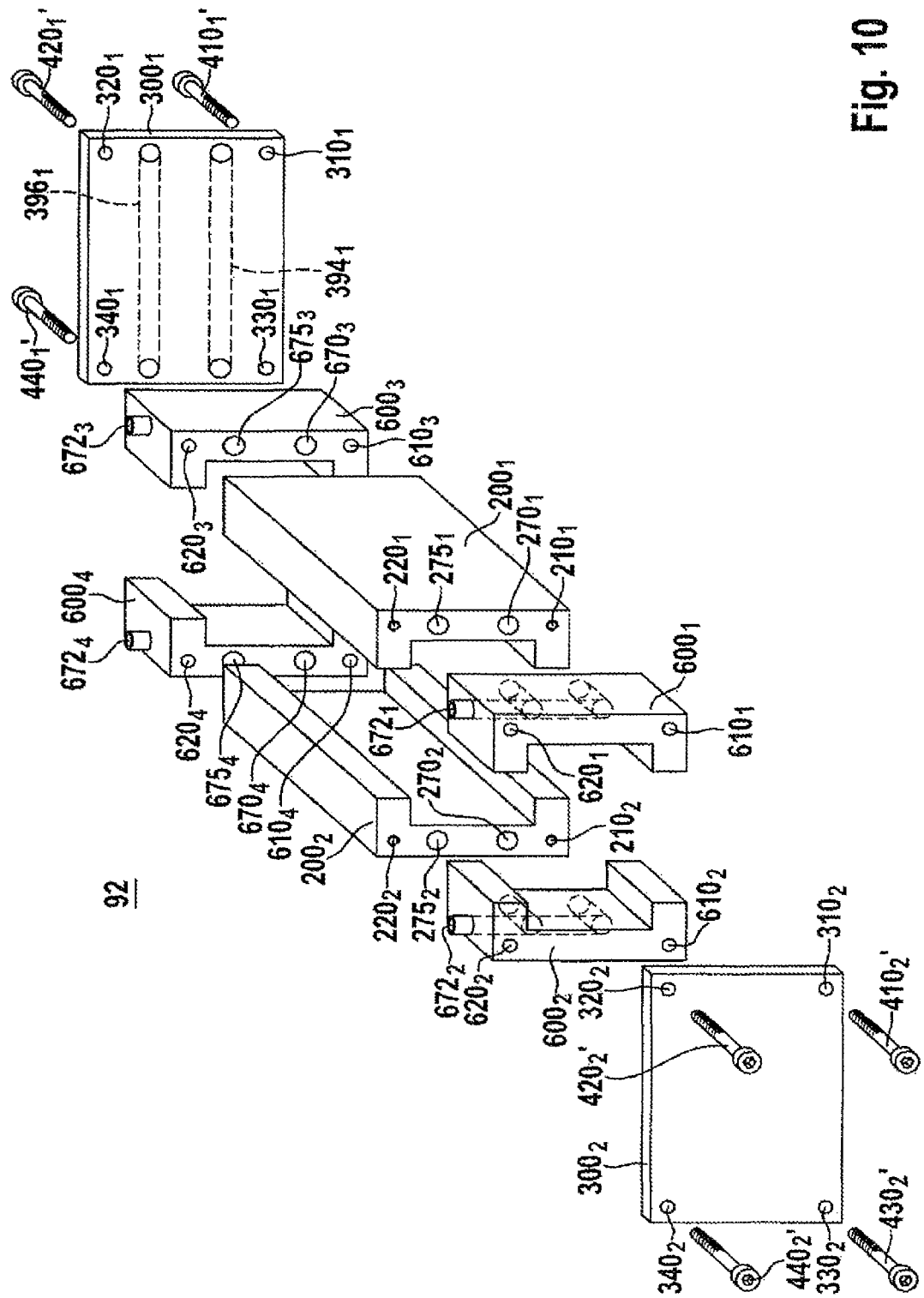
FIG. 10 shows a schematic perspective exploded view of a module carrier 92 according to another embodiment of the invention.

FIG. 10 shows a schematic perspective exploded illustration of a module carrier 92 according to another embodiment of the invention.

The module carrier 92 is similar to the module carrier 90 described with respect to FIG. 9. The module carrier 92 furthermore comprises a third connection device $600_3$ and a fourth connection device $600_4$, which correspond to the first connection device $600_1$. The third connection device $600_3$ and the fourth connection device $600_4$ are arranged between the first carrier device $200_1$ or the second carrier device $200_2$ and the first connecting device $300_1$, and therefore the first connecting device $300_1$, which is described with respect to FIG. 1 and does not comprise any channels and/or connectors, can be used. The four connection devices $600_1$, $600_2$, $600_3$, $600_4$ can be of identical design. The lengths of the first carrier device $200_1$ and of the second carrier device $200_2$ in the first direction in space (x) can be shortened by the lengths of the first connection device $600_1$ and of the third connection device $600_3$ or of the second connection device $600_2$ and of the fourth connection device $600_4$. Furthermore, the screws $410_1'$, $420_1'$, $430_1'$, $440_1'$ can be adapted with respect to the length thereof.

Figure 11:
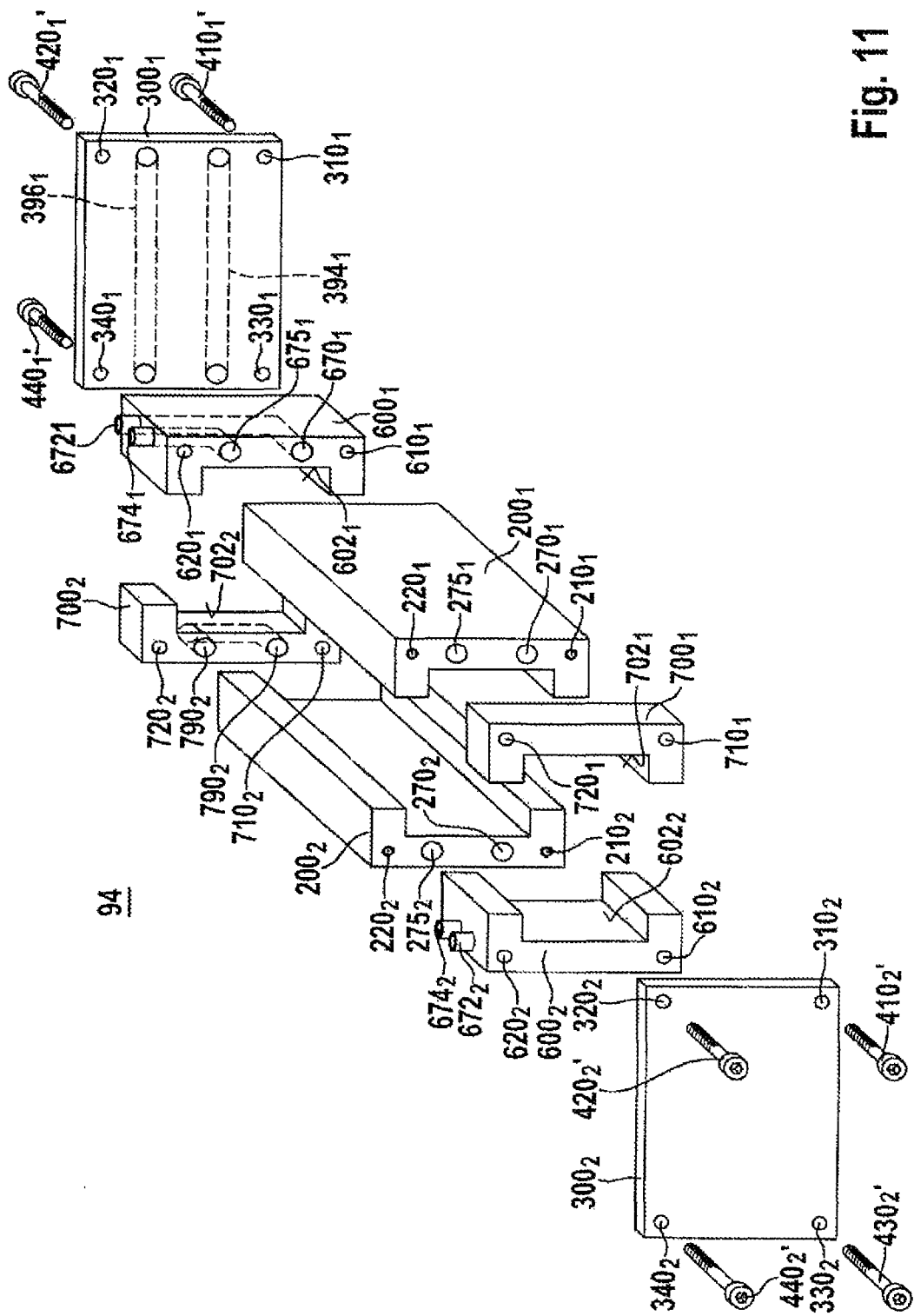
FIG. 11 shows a schematic perspective exploded view of a module carrier 94 according to another embodiment of the invention.

FIG. 11 shows a schematic perspective exploded view of a module carrier 94 according to another embodiment of the invention.

The module carrier 94 is similar to the module carriers 90, 92 described with respect to FIGS. 9 and 10.

In this embodiment, the first connection device $600_1$ comprises a connection channel $670_1$, which is connectable to the channel $270_1$ of the first carrier device $200_1$ and comprises a connector $672_1$, and a further connection channel $675_1$, which is connectable to the further channel $275_1$ of the first carrier device $200_1$ and comprises a connector $674_1$, for the inflow or outflow of the temperature control medium. As a result, the connection to the temperature control system is also facilitated and simplified. As shown by way of example in FIG. 11, the connectors $672_1$, $674_2$ can be arranged on the first connection device $600_1$ along the third direction in space (z), for example on the upper side, with respect to the use according to the specifications. The first connection device $600_1$ is arranged between the first carrier device $200_1$ and the first connecting device $300_1$ such that the first connecting device $300_1$, which is described with respect to FIG. 1 and does not comprise any channels and/or connectors, can be used. The screws $410_1'$, $420_1'$ can be adapted with respect to the length thereof, and therefore the first connecting device $300_1$ can be screwed to the first carrier device $200_1$.

The module carrier 94 furthermore comprises a first return device $700_1$ which comprises a return channel, which is connectable to the channel $270_1$ and to the further channel $275_1$ of the first carrier device $200_1$, for the return of the temperature control medium which, for example, first of all, coming from the first connection device $600_1$, flows via the channel $270_1$ through the first carrier device $200_1$ and subsequently, then coming from the first return device $700_1$, once again flows through the first carrier device $200_1$ via the further channel $275_1$. The return channel can be formed in the interior of the first return device $700_1$ and can comprise two openings which are spaced apart from each other. Alternatively, the return channel can be designed as a depression or trench. The first return device $700_1$ is arranged between the first carrier device $200_1$ and the second connecting device $300_2$ such that the second connecting device $300_2$, which is described with respect to FIG. 1 and does not comprise any channels and/or connections, can be used. The first return device $700_1$ comprises a receiving region $702_1$ which is adapted with respect to cross section, size and/or position to the first receiving region $202_1$ of the first carrier device $200_1$. The length of the return device $700_1$ in the first direction in space (x) can be different, in particular shorter, than the length of the first connection device $600_1$. The length of the first carrier device $200_1$ in the first direction in space (x) can be shortened by the length of the first return device $700_1$. The screws $410_2'$, $420_2'$ can be adapted in respect of the length thereof, and therefore the second connecting device $300_2$ can be screwed to the first carrier device $200_1$.

In a corresponding manner, the module carrier 90 can comprise a second connection device $600_2$ which comprises a connection channel, which is connectable to the channel $270_2$ of the second carrier device $200_2$, and a connector $674_2$, and a further connection channel, which is connectable to the further channel $275_2$ of the second carrier device $200_2$ and comprises a connector $674_2$, for the inflow or outflow of the temperature control medium, and a second return device $700_2$ which comprises a return channel $790_2$, which is connectable to the channel $270_2$ and to the further channel $275_2$ of the second carrier device $200_2$, for the return of the temperature control medium. The connection devices $600_1$, $600_2$ are preferably of identical design, and the return devices $700_1$, $700_2$ are preferably of identical design, and therefore the number of different components is reduced.

Figure 12:
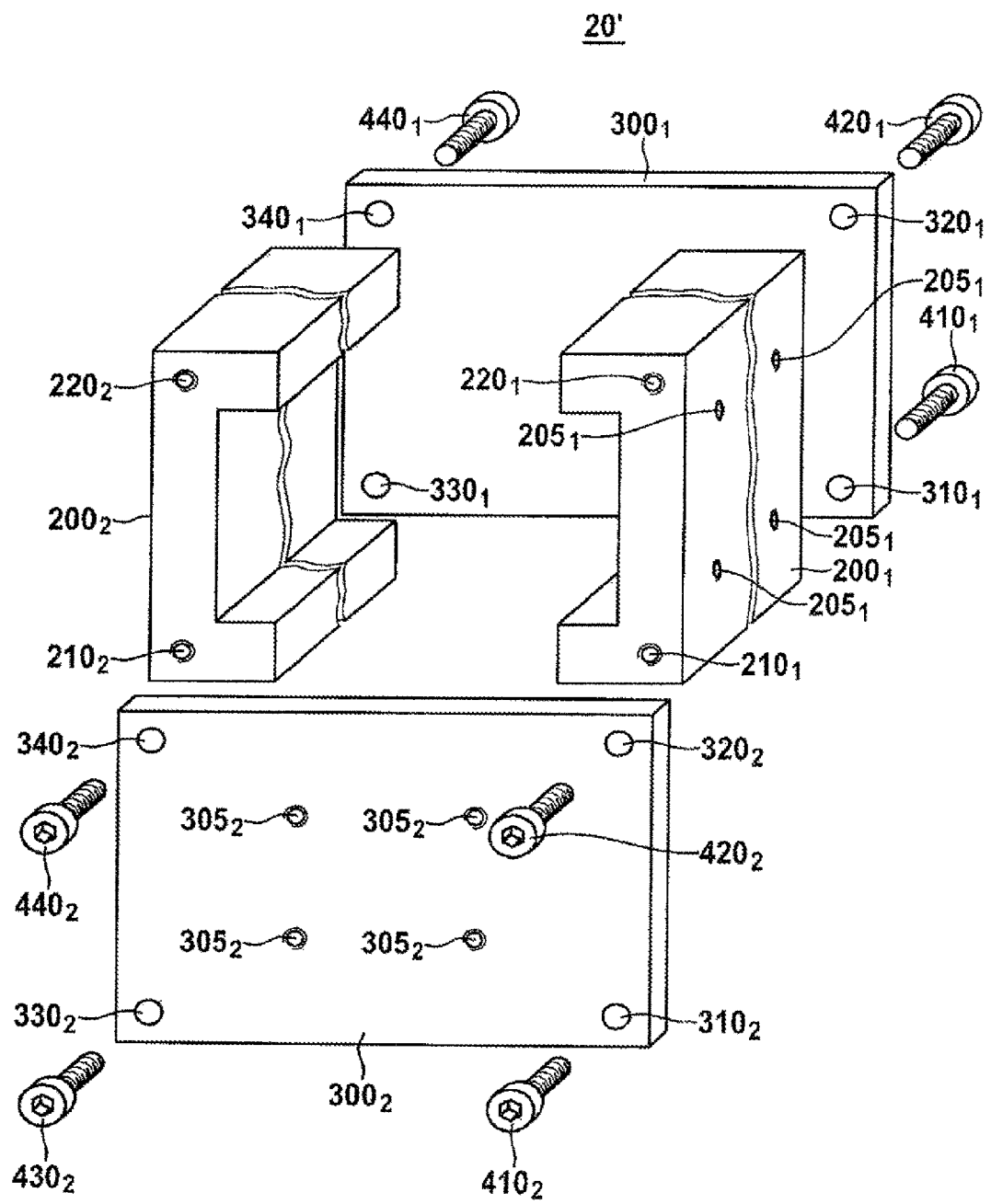
FIG. 12 shows a schematic perspective exploded view of a module carrier 20' according to a further embodiment of the invention.

FIG. 12 shows a schematic perspective exploded view of a module carrier 20' according to a further embodiment of the invention.

The module carrier 20' corresponds to the module carrier described with respect to FIG. 1, and furthermore comprises fastening devices $205_1$, $305_1$, for example fastening holes or threaded holes for fastening the module carrier 20', and therefore the module carrier 20' can be fastened, for example by means of screws, in or to a battery pack, a battery, a battery system or a vehicle. As shown by way of example in FIG. 12, the fastening devices $205_1$, $305_1$ can be arranged at or on the carrier devices $200_1$, $200_2$ and/or connecting devices $300_1$, $300_2$. The fastening devices $205_1$, $305_1$ are preferably arranged in a grid, and therefore the module carrier 20' is scalable with respect to the number of battery cells $100_1$, $100_2$, $100_3$. The fastening devices $205_1$, $305_1$ are preferably spaced apart from the channels for the temperature control medium in such a manner that damage to the channels, for example by screws which are not adapted in respect of diameter, length and/or thread properties, such as type of thread or thread pitch, to fastening devices $205_1$, $305_1$, is reliably prevented.

The features of the module carriers 20; 20'; 30; 40; 50; 60; 70; 80; 90; 92; 94, for example the module carriers shown in FIGS. 2, 5 and/or 12, can be combined with one another.

What is claimed is:

1. A module carrier (20; 20'; 30; 40; 50; 60; 70; 80; 90; 92; 94) for battery cells ($100_1$, $100_2$, $100_3$), comprising:
   a first carrier device ($200_1$) and a second carrier device ($200_2$), which is arranged opposite the first carrier device ($200_1$), for carrying the battery cells ($100_1$, $100_2$, $100_3$), and
   a first connecting device ($300_1$) and a second connecting device ($300_2$), which is arranged opposite the first connecting device ($300_1$) such that the second connecting device ($300_2$) is spaced from the first connecting device ($300_1$) in a first direction in space (x), in each case for connecting the first carrier device ($200_1$) and the second carrier device ($200_2$),
   wherein the battery cells ($100_1$, $100_2$, $100_3$) are configured to be oriented next to one another in the module carrier (20; 20'; 30; 40; 50; 60; 70; 80; 90; 92; 94) along the first direction and between the first connecting device ($300_1$) and the second connecting device ($300_2$),
   wherein the first carrier device ($200_1$) comprises a first receiving region ($202_1$) and the second carrier device ($200_2$) comprises a second receiving region ($202_2$), the first and second receiving regions ($202_1$, $202_2$) both partially receiving the battery cells ($100_1$, $100_2$, $100_3$),
   wherein the first carrier device ($200_1$) and the second carrier device ($200_2$) are arranged in such a manner that the first receiving region ($202_1$) and the second receiving region ($202_2$) are arranged opposite each other in a second direction, which is perpendicular to the first direction,
   wherein the first connecting device ($300_1$) and the second connecting device ($300_2$) are connected to the first carrier device ($200_1$) and to the second carrier device ($200_2$) in such a manner that the battery cells ($100_1$, $100_2$, $100_3$) are fixed in the module carrier (20; 20'; 30; 40; 50; 60; 70; 80; 90; 92; 94),
   wherein the first carrier device ($200_1$) includes a first side wall, a first projection that is formed on the first side wall, and a second projection that is formed on the first side wall at a distance from the first projection, wherein the first receiving region ($202_1$) is formed by the first side wall, the first projection, and the second projection,
   wherein the second carrier device ($200_2$) includes a second side wall, a third projection that is formed on the second side wall, and a fourth projection that is formed on the second side wall at a distance from the third projection, wherein the second receiving region ($202_2$) is formed by the second side wall, the third projection, and the fourth projection:
   wherein the first carrier device ($200_1$) comprises a first channel ($270_1$) which extends in the first direction and is enclosed in the first side wall of the first carrier device ($200_1$) such that the first channel ($270_1$) conducts a temperature control medium through the first side wall, and
   the second carrier device ($200_2$) comprises a second channel ($270_2$) which extends in the first direction and is enclosed in the second side wall of the second carrier device ($200_2$) such that the second channel ($270_2$) conducts the temperature control medium through the second side wall;
   wherein the first carrier device ($200_1$) further comprises a third channel ($275_1$) which extends in the first direction, is spaced from the first channel ($270_1$), and is enclosed in the first side wall of the first carrier device ($200_1$) such that the third channel ($275_1$) conducts the temperature control medium through the first side wall, and the first channel ($270_1$) and the third channel ($275_1$) are parallel throughout a length of the first carrier device ($200_1$), and
   the second carrier device ($200_2$) further comprises a fourth channel ($275_2$) which extends in the first direction, is spaced from the second channel ($270_2$), and is enclosed in the second side wall of the second carrier device ($200_2$) such that the fourth channel ($275_2$) conducts the temperature control medium through the second side wall and the second channel ($270_2$) and the fourth channel ($275_2$) are parallel throughout a length of the second carrier device ($200_2$); and wherein the module carrier (20; 20'; 30; 40; 50; 60; 70; 80; 90; 92; 94) comprises:
- a first connection device ($600_1$) that is positioned between the first carrier and the second connecting device, the first connection device including a first connection channel ($670_1$, $675_1$), which is connectable to the first channel ($270_1$) and to the third channel ($275_1$), and a first connector ($672_1$) communicating with the first connection channel ($670_1$, $675_1$) for the inflow or outflow of the temperature control medium, and
- a second connection device ($600_2$) that is positioned between the second carrier and the second connecting device, the second connection device including a second connection channel ($670_2$, $675_2$), which is connectable to the second channel ($270_2$) and to the fourth channel ($275_2$), and a second connector ($672_2$) communicating with the second connection channel ($670_2$, $675_2$) for the inflow or outflow of the temperature control medium.

2. The module carrier (20; 20'; 30; 40; 50; 60; 70; 80; 90; 92; 94) according to claim 1,
wherein the battery cells ($100_1$, $100_2$, $100_3$) comprise cell bases and cell covers,
wherein the first projection guides the cell bases, and the second projection guides the cell covers, and
wherein the third projection guides the cell bases, and the fourth projection guides the cell covers.

3. The module carrier (20; 20'; 30; 40; 50; 60; 70; 80; 90; 92; 94) according to claim 2, wherein:
the battery cells ($100_1$, $100_2$, $100_3$) comprise cell terminals ($150_1$, $150_2$, $150_3$, $155_1$, $155_2$, $155_3$) which are arranged on the cell covers,
the second projection and the fourth projection are reliably spaced apart from the cell terminals ($150_1$, $150_2$, $150_3$, $155_1$, $155_2$, $155_3$), or
the second projection and the fourth projection are configured such that the cell terminals ($150_1$, $150_2$, $150_3$, $155_1$, $155_2$, $155_3$) are reliably concealed.

4. The module carrier (20; 20'; 30; 40; 50; 60; 70; 80; 90; 92; 94) according to claim 1, wherein:
the first carrier device ($200_1$) and the second carrier device ($200_2$) are designed as a profile, U-shaped profile or extruded profile,
the length of the first carrier device ($200_1$) and the length of the second carrier device ($200_2$) along the first direction in space (x) are adaptable to the length of the battery cells ($100_1$, $100_2$, $100_3$) in the first direction in space (x), or
the first carrier device ($200_1$) and the second carrier device ($200_2$) are formed from plastic, metal or aluminum.

5. The module carrier (20; 20'; 30; 40; 50; 60; 70; 80; 90; 92; 94) according to claim 1, wherein:
the first connecting device ($300_1$) comprises a first connection channel ($370_1$, $380_1$), which is connectable to the first channel ($270_1$) or to the second channel ($270_2$), with a first connector ($372_1$, $382_1$) for the inflow or outflow of the temperature control medium,
the first connecting device ($300_1$) comprises a first transfer channel ($394_1$), which is connectable to the first channel ($270_1$) and to the second channel ($270_2$), for transferring the temperature control medium,
the first connecting device ($300_1$) comprises a second transfer channel ($396_1$), which is connectable to the third channel ($275_1$) and to the fourth channel ($275_2$), for transferring the temperature control medium,
the first connecting device ($300_1$) comprises a first return channel ($390_1$), which is connectable to the first channel ($270_1$) and to the third channel ($275_1$), and a second return channel ($392_1$), which is connectable to the second channel ($270_2$) and to the fourth channel ($275_2$), in each case for the return of the temperature control medium,
the second connecting device ($300_2$) comprises a second connection channel, which is connectable to the first channel ($270_1$) or to the second channel ($270_2$), with a second connector ($372_2$, $382_2$) for the inflow or outflow of the temperature control medium,
the second connecting device ($300_2$) comprises a third connection channel, which is connectable to the third channel ($275_1$) or to the fourth channel ($275_2$), with a third connector ($376_2$, $386_2$) for the inflow or outflow of the temperature control medium, or
the module carrier (20; 20'; 30; 40; 50; 60; 70; 80; 90; 92; 94) comprises seals for sealing a circuit of the temperature control medium.

6. The module carrier (20; 20'; 30; 40; 50; 60; 70; 80; 90; 92; 94) according to claim 1, further comprising:
a baseplate (500),
wherein:
the first connecting device ($300_1$) and the second connecting device ($300_2$) are connected to the baseplate (500) in such a manner that the baseplate (500) is arranged between the first carrier device ($200_1$) and the second carrier device ($200_2$).

7. The module carrier (20; 20'; 30; 40; 50; 60; 70; 80; 90; 92; 94) according to claim 1, wherein:
the first carrier device ($200_1$), the second carrier device ($200_2$), the first connecting device ($300_1$) or the second connecting device ($300_2$) comprise fastening devices ($205_1$, $305_1$) or fastening holes for fastening the module carrier (20; 20'; 30; 40; 50; 60; 70; 80; 90; 92; 94).

8. A battery module (10), comprising:
the module carrier (20; 20'; 30; 40; 50; 60; 70; 80; 90; 92; 94) according to claim 1, and
the battery cells ($100_1$, $100_2$, $100_3$).

9. A battery pack, comprising:
the battery module (10) according to claim 8.

10. A battery, comprising:
the battery pack according to claim 9.

11. The battery system comprising, comprising:
the battery according to claim 10.

12. A vehicle comprising:
the battery system according to claim 11 connected to the vehicle.

13. A method for producing a module carrier (20; 20'; 30; 40; 50; 60; 70; 80; 90; 92; 94) for battery cells ($100_1$, $100_2$, $100_3$), comprising:
providing a first carrier device ($200_1$) and a second carrier device ($200_2$), which is arranged opposite the first carrier device ($200_1$), for carrying the battery cells ($100_1$, $100_2$, $100_3$), and
providing a first connecting device ($300_1$) and a second connecting device ($300_2$), which is arranged opposite the first connecting device ($300_1$) such that the second connecting device ($300_2$) is spaced from the first connecting device ($300_1$) in a first direction in space (x), in each case for connecting the first carrier device ($200_1$) and the second carrier device ($200_2$),
wherein the battery cells ($100_1$, $100_2$, $100_3$) are configured to be oriented next to one another in the module carrier (20; 20'; 30; 40; 50; 60; 70; 80; 90; 92; 94) along the first direction and between the first connecting device ($300_1$) and the second connecting device ($300_2$), wherein the first carrier device ($200_1$) comprises a first receiving region ($202_1$) and the second carrier device ($200_2$) comprises a second receiving region ($202_2$), the first and second receiving regions ($202_1$, $202_2$) both partially receiving the battery cells ($100_1$, $100_2$, $100_3$), wherein the first carrier device ($200_1$) and the second carrier device ($200_2$) are arranged in such a manner that the first receiving region ($202_1$) and the second receiving region ($202_2$) are arranged opposite each other in a second direction, which is perpendicular to the first direction, wherein the first connecting device ($300_1$) and the second connecting device ($300_2$) are connected to the first carrier device ($200_1$) and to the second carrier device ($200_2$) in such a manner that the battery cells ($100_1$, $100_2$, $100_3$) are fixed in the module carrier (20; 20'; 30; 40; 50; 60; 70; 80; 90; 92; 94)

wherein the first carrier device ($200_1$) includes a first side wall, a first projection that is formed on the first side wall, and a second projection that is formed on the first side wall at a distance from the first projection, wherein the first receiving region ($202_1$) is formed by the first side wall, the first projection, and the second projection, wherein the second carrier device ($200_2$) includes a second side wall, a third projection that is formed on the second side wall, and a fourth projection that is formed on the second side wall at a distance from the third projection, wherein the second receiving region ($202_2$) is formed by the second side wall, the third projection, and the fourth projection, and wherein the first carrier device ($200_1$) comprises a first channel ($270_1$) which extends in the first direction and is enclosed in the first side wall of the first carrier device ($200_1$) such that the first channel ($270_1$) conducts a temperature control medium through the first side wall, and the second carrier device ($200_2$) comprises a second channel ($270_2$) which extends in the first direction and is enclosed in the second side wall of the second carrier device ($200_2$) such that the second channel ($270_2$) conducts the temperature control medium through the second side wall; and wherein the first carrier device ($200_1$) further comprises a third channel ($275_1$) which extends in the first direction, is spaced from the first channel ($270_1$), and is enclosed in the first side wall of the first carrier device ($200_1$) such that the third channel ($275_1$) conducts the temperature control medium through the first side wall, and the first channel ($270_1$) and the third channel ($275_1$) are parallel throughout a length of the first carrier device ($200_1$), and the second carrier device ($200_2$) further comprises a fourth channel ($275_2$) which extends in the first direction, is spaced from the second channel ($270_2$), and is enclosed in the second side wall of the second carrier device ($200_2$) such that the fourth channel ($275_2$) conducts the temperature control medium through the second side wall and the second channel ($270_2$) and the fourth channel ($275_2$) are parallel throughout a length of the second carrier device ($200_2$) wherein the module carrier (20; 20'; 30; 40; 50; 60; 70; 80; 90; 92; 94) comprises:

a first connection device ($600_1$) that is positioned between the first carrier and the second connecting device, the first connection device including a first connection channel ($670_1$, $675_1$), which is connectable to the first channel ($270_1$) and to the third channel ($275_1$), and a first connector ($672_1$) communicating with the first connection channel ($670_1$, $675_1$) for the inflow or outflow of the temperature control medium, and a second connection device ($600_2$) that is positioned between the second carrier and the second connecting device, the second connection device including a second connection channel ($670_2$, $675_2$), which is connectable to the second channel ($270_2$) and to the fourth channel ($275_2$), and a second connector ($672_2$) communicating with the second connection channel ($670_2$, $675_2$) for the inflow or outflow of the temperature control medium.

14. The method according to claim 13:
wherein the battery cells ($100_1$, $100_2$, $100_3$) comprise cell bases and cell covers,
wherein the first projection guides the cell bases, and the second projection guides the cell covers, and
wherein the third projection guides the cell bases, and the fourth projection guides the cell covers.

15. The method according to claim 14, wherein:
the battery cells ($100_1$, $100_2$, $100_3$) comprise cell terminals ($150_1$, $150_2$, $150_3$, $155_1$, $155_2$, $155_3$) which are arranged on the cell covers,
the second projection and the fourth projection are designed in such a manner that they are reliably spaced apart from the cell terminals ($150_1$, $150_2$, $150_3$, $155_1$, $155_2$, $155_3$), or
the second projection and the fourth projection are designed in such a manner that the cell terminals ($150_1$, $150_2$, $150_3$, $155_1$, $155_2$, $155_3$) are reliably concealed.

16. The method according to claim 13, wherein:
the first carrier device ($200_1$) and the second carrier device ($200_2$) are designed as a profile, U-shaped profile or extruded profile,
the length of the first carrier device ($200_1$) and the length of the second carrier device ($200_2$) along the first direction in space (x) are adaptable to the length of the battery cells ($100_1$, $100_2$, $100_3$) in the first direction in space (x), or
the first carrier device ($200_1$) and the second carrier device ($200_2$) are formed from plastic, metal or aluminum.

17. The method according to claim 13, wherein:
the first connecting device ($300_1$) comprises a first connection channel ($370_1$, $380_1$), which is connected to the first channel ($270_1$) or to the second channel ($270_2$), with a first connector ($372_1$, $382_1$) for the inflow or outflow of the temperature control medium,
the first connecting device ($300_1$) comprises a first transfer channel ($394_1$), which is connected to the first channel ($270_1$) and to the second channel ($270_2$), for transferring the temperature control medium,
the first connecting device ($300_1$) comprises a second transfer channel ($396_1$), which is connected to the third channel ($275_1$) and to the fourth channel ($275_2$), for transferring the temperature control medium,
the first connecting device ($300_1$) comprises a first return channel ($390_1$), which is connected to the first channel ($270_1$) and to the third channel ($275_1$), and a second return channel ($392_1$), which is connected to the second channel ($270_2$) and to the fourth channel ($275_2$), in each case for the return of the temperature control medium, the second connecting device ($300_2$) comprises a second connection channel, which is connected to the first channel ($270_1$) or to the second channel ($270_2$), with a second connector ($372_2$, $382_2$) for the inflow or outflow of the temperature control medium, the second connecting device ($300_2$) comprises a third connection channel, which is connected to the third channel ($275_1$) or to the fourth channel ($275_2$), with a third connector ($376_2$, $386_2$) for the inflow or outflow of the temperature control medium, or the module carrier (20; 20'; 30; 40; 50; 60; 70; 80; 90; 92; 94) comprises seals for sealing a circuit of the temperature control medium.

18. The method according to claim 13, further comprising:

providing a baseplate (500), wherein:

the first connecting device ($300_1$) and the second connecting device ($300_2$) are connected to the baseplate (500) in such a manner that the baseplate (500) is arranged between the first carrier device ($200_1$) and the second carrier device ($200_2$).

19. The method according to claim 13, wherein:

the first carrier device ($200_1$), the second carrier device ($200_2$), the first connecting device ($300_1$) or the second connecting device ($300_2$) comprise fastening devices ($205_1$, $305_1$) or fastening holes for fastening the module carrier (20; 20'; 30; 40; 50; 60; 70; 80; 90; 92; 94).

* * * * *